United States Patent
Park et al.

(10) Patent No.: US 10,798,421 B2
(45) Date of Patent: Oct. 6, 2020

(54) METHOD FOR ENCODING AND DECODING IMAGE INFORMATION

(71) Applicant: LG Electronics Inc., Seoul (KR)

(72) Inventors: Seungwook Park, Seoul (KR); Jungsun Kim, Seoul (KR); Yongjoon Jeon, Seoul (KR); Joonyoung Park, Seoul (KR); Byeongmoon Jeon, Seoul (KR); Jaehyun Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/715,895

(22) Filed: Dec. 16, 2019

(65) Prior Publication Data

US 2020/0120361 A1    Apr. 16, 2020

Related U.S. Application Data

(63) Continuation of application No. 15/996,877, filed on Jun. 4, 2018, now Pat. No. 10,531,126, which is a
(Continued)

(51) Int. Cl.
*H04N 19/80* (2014.01)
*H04N 19/13* (2014.01)
(Continued)

(52) U.S. Cl.
CPC .......... *H04N 19/80* (2014.11); *H04N 19/117* (2014.11); *H04N 19/13* (2014.11); *H04N 19/132* (2014.11);
(Continued)

(58) Field of Classification Search
None
See application file for complete search history.

(56) References Cited

U.S. PATENT DOCUMENTS

| 7,742,524 B2 | 6/2010 | Jeon |
| 7,742,532 B2 | 6/2010 | Jeon |
(Continued)

FOREIGN PATENT DOCUMENTS

| CN | 1652610 | 8/2005 |
| CN | 103765904 | 4/2014 |
(Continued)

OTHER PUBLICATIONS

International Search Report dated Dec. 27, 2012 for Application No. PCT/KR2012/004692, with English Translation, 6 pages.
(Continued)

*Primary Examiner* — Talha M Nawaz
(74) *Attorney, Agent, or Firm* — Fish & Richardson P.C.

(57) ABSTRACT

The present invention relates to a method for encoding and decoding image information and to an apparatus using same, and the method for encoding the image information, according to the present invention, comprises the steps of: generating a recovery block; applying a deblocking filter to the recovery block; applying a sample adaptive offset (SAO) to the recovery block to which the deblocking filter is applied; and transmitting the image information including information on the SAO which is applied, wherein in the step of transmitting, information for specifying bands that cover a scope of a pixel value, to which a band off set is applied, is transmitted when the band offset is applied during the step of applying the SAO.

18 Claims, 18 Drawing Sheets

Related U.S. Application Data continuation of application No. 15/217,765, filed on Jul. 22, 2016, now Pat. No. 9,992,515, which is a continuation of application No. 14/126,544, filed as application No. PCT/KR2012/004692 on Jun. 14, 2012, now Pat. No. 9,565,453.

(60) Provisional application No. 61/497,045, filed on Jun. 14, 2011.

(51) Int. Cl.
| | |
|---|---|
| *H04N 19/132* | (2014.01) |
| *H04N 19/70* | (2014.01) |
| *H04N 19/61* | (2014.01) |
| *H04N 19/186* | (2014.01) |
| *H04N 19/82* | (2014.01) |
| *H04N 19/117* | (2014.01) |
| *H04N 19/44* | (2014.01) |
| *H04N 19/50* | (2014.01) |
| *H04N 19/126* | (2014.01) |
| *H04N 19/98* | (2014.01) |

(52) U.S. Cl.
CPC .......... *H04N 19/186* (2014.11); *H04N 19/44* (2014.11); *H04N 19/50* (2014.11); *H04N 19/61* (2014.11); *H04N 19/70* (2014.11); *H04N 19/82* (2014.11); *H04N 19/126* (2014.11); *H04N 19/98* (2014.11)

(56) References Cited

U.S. PATENT DOCUMENTS

| | | | |
|---|---|---|---|
| 7,956,930 | B2 | 6/2011 | Sullivan |
| 7,995,649 | B2 | 8/2011 | Zuo |
| 8,054,885 | B2 | 11/2011 | Jeon |
| 8,184,698 | B2 | 5/2012 | Jeon |
| 8,229,274 | B2 | 7/2012 | Jeon |
| 2007/0160153 | A1 | 7/2007 | Sullivan |
| 2007/0248164 | A1 | 10/2007 | Zuo |
| 2008/0025632 | A1 | 1/2008 | Bjontegaard |
| 2008/0069247 | A1 | 3/2008 | Zhongll |
| 2008/0170615 | A1 | 7/2008 | Shunichi |
| 2009/0010331 | A1 | 1/2009 | Jeon |
| 2009/0010332 | A1 | 1/2009 | Jeon |
| 2009/0060040 | A1 | 3/2009 | Jeon |
| 2009/0220010 | A1 | 9/2009 | Park |
| 2009/0310680 | A1 | 12/2009 | Jeon |
| 2010/0158116 | A1 | 6/2010 | Jeon |
| 2011/0026600 | A1 | 2/2011 | Kenji |
| 2011/0188581 | A1 | 8/2011 | Choi |
| 2011/0292994 | A1 | 12/2011 | Lim |
| 2011/0305274 | A1* | 12/2011 | Fu .................. H04N 19/46 375/240.02 |
| 2012/0177107 | A1* | 7/2012 | Fu .................. H04N 19/162 375/240.03 |
| 2012/0207227 | A1* | 8/2012 | Tsai .................. H04N 19/174 375/240.29 |
| 2012/0294353 | A1* | 11/2012 | Fu .................. H04N 19/176 375/240.02 |
| 2013/0182759 | A1* | 7/2013 | Kim .................. H04N 19/86 375/240.02 |
| 2013/0188737 | A1* | 7/2013 | Maani .................. H04N 19/96 375/240.25 |
| 2016/0080740 | A1* | 3/2016 | Sze .................. H04N 19/124 375/240.02 |

FOREIGN PATENT DOCUMENTS

| | | |
|---|---|---|
| CN | 103733627 | 11/2017 |
| EP | 2725797 | 4/2014 |
| JP | 2735355 | 4/1998 |
| KR | 10-2005-0099256 | 10/2005 |
| KR | 10-2008-0085156 | 9/2008 |
| KR | 10-2009-0006080 | 1/2009 |
| KR | 10-0896291 | 5/2009 |
| KR | 10-2010-0007728 | 1/2010 |
| WO | 2007/081752 | 7/2007 |
| WO | 2007/117707 | 10/2007 |
| WO | 2008/030067 | 3/2008 |
| WO | 2008/030068 | 3/2008 |
| WO | 2008/056959 | 5/2008 |
| WO | 2008/060125 | 5/2008 |
| WO | 2008/060126 | 5/2008 |
| WO | 2008/060127 | 5/2008 |
| WO | 2010/005269 | 1/2010 |
| WO | 2012/155553 | 11/2012 |

OTHER PUBLICATIONS

Supplementary European Search Report dated Oct. 29, 2014 for European Application No. 12800855.4, 11 pages.

Chih-Ming Fu et al.: "Sample Adaptive Offset for Chroma", 97. MPEG Meeting; 18/7/2011 - 22-72011; Torino; (Motion Picture Expert Group or ISO/IEC JTC1/SC29/WG11), No. M20469, Jul. 20, 2011 (Jul. 20, 2011), XP030049033.

Chih-Ming Fu et al: "CE13: Sample Adaptive Offset with LCU-Independent Decoding", 20110310, No. JCTVC-E049, Mar. 10, 2011 (Mar. 10, 2011), XP030008555, ISSN: 0000-0007.

Chih-Ming Fu et al: "Non-CE8: Offset coding in SAO", 98. MPEG Meeting; Nov. 28-Dec. 2, 2011; Geneva; (Motion Picture Expert Group or ISO/IEC JTC1/SC29/WG11), No. M21781, Nov. 21, 2011 (Nov. 21, 2011), XP030050344.

Anonymous: "High Efficiency Video Coding (HEVC) Working Draft 4", 97. MPEG Meeting; Jul. 18, 2011-Jul. 22, 2011; Torino; (Motion Picture Expert Group or ISO/IEC JTC1/SC29/WG11), No. N12186, Oct. 2, 2011 (Oct. 2, 2011), XP030018681.

European Search Report dated Aug. 10, 2015 for European Application No. 12 800 855.4, 10 pages.

U.S. Office Action dated Aug. 21, 2015 for U.S. Appl. No. 14/694,499, 10 pages.

Bross B. et al.; "High Efficiency Video Coding (HEVC) text specification draft 6", 99. MPEG Meeting; Feb. 6, 2012-Feb. 10, 2012; San Jose; (Motion Picture Expert Group or ISO/IEC JTC1/SC29/WG11), No. m24004, Apr. 2, 2012 (Apr. 2, 2012), XP030052529.

Maani E. et al.; "Flexible Band Offset Mode in SAO", 8. JCT-VG Meeting; 99. MPEG Meeting; Feb. 1, 2012-Feb. 10, 2012; San Jose; (Joint Collaborative Team on Video Coding of ISO/IEC JTC1/SC29/WG11 and ITU-T SG.16 ); URL: http://wftp3.itu.int/av-arch/jctvc-site/, No. JCTVC-H0406, Jan. 21, 2012 (Jan. 21, 2012), XP030111433.

McCann K et Al: "HEVC Test Model 3 {Hm 3) Encoder Description", Jun. 2, 2011, No. JCTVC-E602, Jun. 2, 2011 (Jun. 2, 2011), ISSN: 0000-0003, XP030009013.

Laroche et al., "On additional SAO Band Offset classifications," Joint Collaborative Team on Video Coding (JCT-VC) of ITU-T SG16 WP3 and ISO/IEC JTC1/SC29/WG11, 7$^{th}$ meeting, Nov. 21-30, 2011, No. JCTVC-G246, 7 pages, XP030110230.

Summons to attend oral proceedings issued in European Application No. 12800855.4 on Oct. 27, 2016, 13 pages.

MediaTek Inc., "CE13: Sample Adaptive Offset with LCU-Independent Decoding", JCTVC-E049, Joint Collaborative Team on Video Coding (JCT-VC) of ITU-T SG16 WP3 and ISO/IEC JTC1/SC29/WG11, Geneva, CH, Mar. 16-23, 2011, 14 pages.

MediaTek Inc., "CE8 Subset3: Picture Quadtree Adaptive Offset", JCTVC-D122, Joint Collaborative Team on Video Coding (JCT-VC) of ITU-T SG16 WP3 and ISO/IEC JTC1/SC29/WG11, Daegu, KR, Jan. 20-28, 2011, 10 pages.

\* cited by examiner

⦿ : Current pixel

○ : Neighboring pixels of current pixel

METHOD FOR ENCODING AND DECODING IMAGE INFORMATION

CROSS REFERENCE TO RELATED APPLICATIONS

This application is a continuation of U.S. application Ser. No. 15/996,877, filed on Jun. 4, 2018, now allowed, which is a continuation of U.S. application Ser. No. 15/217,765, filed Jul. 22, 2016, now U.S. Pat. No. 9,992,515, which is a continuation of U.S. application Ser. No. 14/126,544, filed Dec. 30, 2013, now U.S. Pat. No. 9,565,453, which is a National Phase application under 35 U.S.C. § 371 of International Application PCT/KR2012/004692, filed on Jun. 14, 2012, which claims the benefit of U.S. Provisional Application No. 61/497,045, filed on Jun. 14, 2011, the entire contents of which are hereby incorporated by reference in their entireties.

TECHNICAL FIELD

The present invention relates to video information compression technology and, more particularly, to a method of applying a Sample Adaptive Offset (SAO) as an in-loop filter.

BACKGROUND ART

A demand for a high-resolution and high-quality video is recently increasing in various application fields. As the resolution and quality of an image becomes high, the amount of information about the video also increases. Accordingly, when video information is transmitted using a medium, such as the existing wired and wireless broadband lines, and video information is stored using the existing storage medium, a cost necessary to send information and a cost necessary to store information are increased.

Video compression technology with high efficiency may be used in order to effectively send, store, and play high-resolution and high-quality video information.

In order to increase video compression efficiency, inter-prediction and intra-prediction may be used. In the inter-prediction method, a pixel value of the current picture is predicted based on information about another picture. In the intra-prediction method, a pixel value is predicted using a correlation between pixels within the same picture.

SUMMARY OF INVENTION

Technical Problem

An object of the present invention is to provide a method of adaptively applying an SAO in order to improve a video reconstruction effect.

Another object of the present invention is to provide a method of applying a band offset by taking intensity, that is, frequency of a pixel for each pixel value into consideration.

Yet another object of the present invention is to provide a method of transferring information for applying a band offset to only valid bands from a video encoder to a video decoder.

Further yet another object of the present invention is to provide a method of applying a plurality of SAOs in the unit of SAO application.

Still yet another object of the present invention is to provide a method and apparatus for applying an SAO to chroma pixels in order to improve a video reconstruction effect.

Technical Solution

An embodiment of the present invention relates to a video information encoding method, including generating a reconstructed block, applying a deblocking filter to the reconstructed block, applying an SAO to the reconstructed block to which the deblocking filter has been applied, and transmitting video information including information about the applied SAO. When a band offset is applied in applying the SAO to the reconstructed block, transmitting the video information may include transmitting information to specify bands that cover a range of pixel values to which the band offset may be applied.

Transmitting the video information may include transmitting information about offset values for the bands that cover the range of pixel values to which the band offset may be applied along with the information to specify the bands that cover the range of pixel values to which the band offset may be applied.

The information to specify the bands that cover the range of pixel values to which the band offset may be applied may include information to specify a first band, from among the bands that cover the range of pixel values to which the band offset may be applied.

Furthermore, the information to specify the bands that cover the range of pixel values to which the band offset may be applied may include information to specify a last band, from among the bands that cover the range of pixel values to which the band offset may be applied.

The information to specify the bands that cover the range of pixel values to which the band offset may be applied may be transmitted in the unit of SAO application.

Another embodiment of the present invention relates to a video information decoding method, including receiving video information including SAO information about an applied SAO, generating a reconstructed block based on the received information, applying a deblocking filter to the reconstructed block, and applying an SAO to the reconstructed block to which the deblocking filter has been applied. The SAO information may include information to specify bands that cover a range of pixel values to which a band offset may be applied, and when the band offset is applied in applying the SAO to the reconstructed block, the band offset may be applied to pixels corresponding to bands indicted by the information to specify the bands.

The SAO information may include values of offsets for the bands that cover the range of pixel values to which the band offset may be applied.

The information to specify the bands that cover the range of pixel values to which the band offset may be applied may include information to specify a first band, from among the bands that cover the range of pixel values to which the band offset may be applied.

Furthermore, the information to specify the bands that cover the range of pixel values to which the band offset may be applied may include information to specify a last band, from among the bands that cover the range of pixel values to which the band offset may be applied.

In the information to specify the bands that cover the range of pixel values to which the band offset may be applied, the bands that cover the range of pixel values to which the band offset may be applied may be specified in the unit of SAO application.

Yet another embodiment of the present invention relates to a video information encoding apparatus, including a filter module for applying a SAO to a reconstructed block and an entropy encoding module for performing entropy encoding on video information including information about the SAO applied in the filter module. If a band offset is applied in the filter module, the SAO information may include information to specify bands that cover the range of pixel values to which the band offset may be applied.

The SAO information may include information about an offset value for the bands that cover the range of pixel values to which the band offset may be applied.

The information to specify the bands that cover the range of pixel values to which the band offset may be applied may include information to specify a first band, from among the bands that cover the range of pixel values to which the band offset may be applied.

Furthermore, the information to specify the bands that cover the range of pixel values to which the band offset may be applied may include information to specify a last band, from among the bands that cover the range of pixel values to which the band offset may be applied.

The information to specify the bands that cover the range of pixel values to which the band offset may be applied may be transmitted in the unit of SAO application.

Further yet another embodiment of the present invention relates to a video information decoding apparatus, including an entropy decoding module for obtaining video information by performing entropy decoding on a received bitstream and a filtering module for applying a SAO to a reconstructed block generated based on the video information. The video information may include information to specify bands that cover a range of pixel values to which a band offset may be applied, and when the band offset is applied, the filtering unit module the band offset to pixels corresponding to the specified bands.

The video information may include values of offsets for the bands that cover the range of pixel values to which the band offset may be applied.

The information to specify the bands that cover the range of pixel values to which the band offset may be applied may include information to specify a first band, from among the bands that cover the range of pixel values to which the band offset may be applied.

Furthermore, the information to specify the bands that cover the range of pixel values to which the band offset may be applied may include information to specify a last band, from among the bands that cover the range of pixel values to which the band offset may be applied.

In the information to specify the bands that cover the range of pixel values to which the band offset may be applied, the bands that cover the range of pixel values to which the band offset may be applied are specified in the unit of SAO application.

Advantageous Effects

According to the present invention, a video reconstruction effect can be improved by adaptively applying an SAO.

According to the present invention, an amount of information to be transferred can be reduced by applying band offset to valid bands only and delivering the information from an encoder to a decoder.

According to the present application a video reconstruction effect can be improved by applying a plurality of SAOs according to the unit of SAO application.

According to the present invention, a video reconstruction effect can be improved by applying an SAO to chroma pixels.

DESCRIPTION OF DRAWINGS

The accompany drawings, which are included to provide a further understanding of this document and are incorporated on and constitute a part of this specification illustrate embodiments of this document and together with the description serve to explain the principles of this document.

MODE FOR INVENTION

Figure 1:
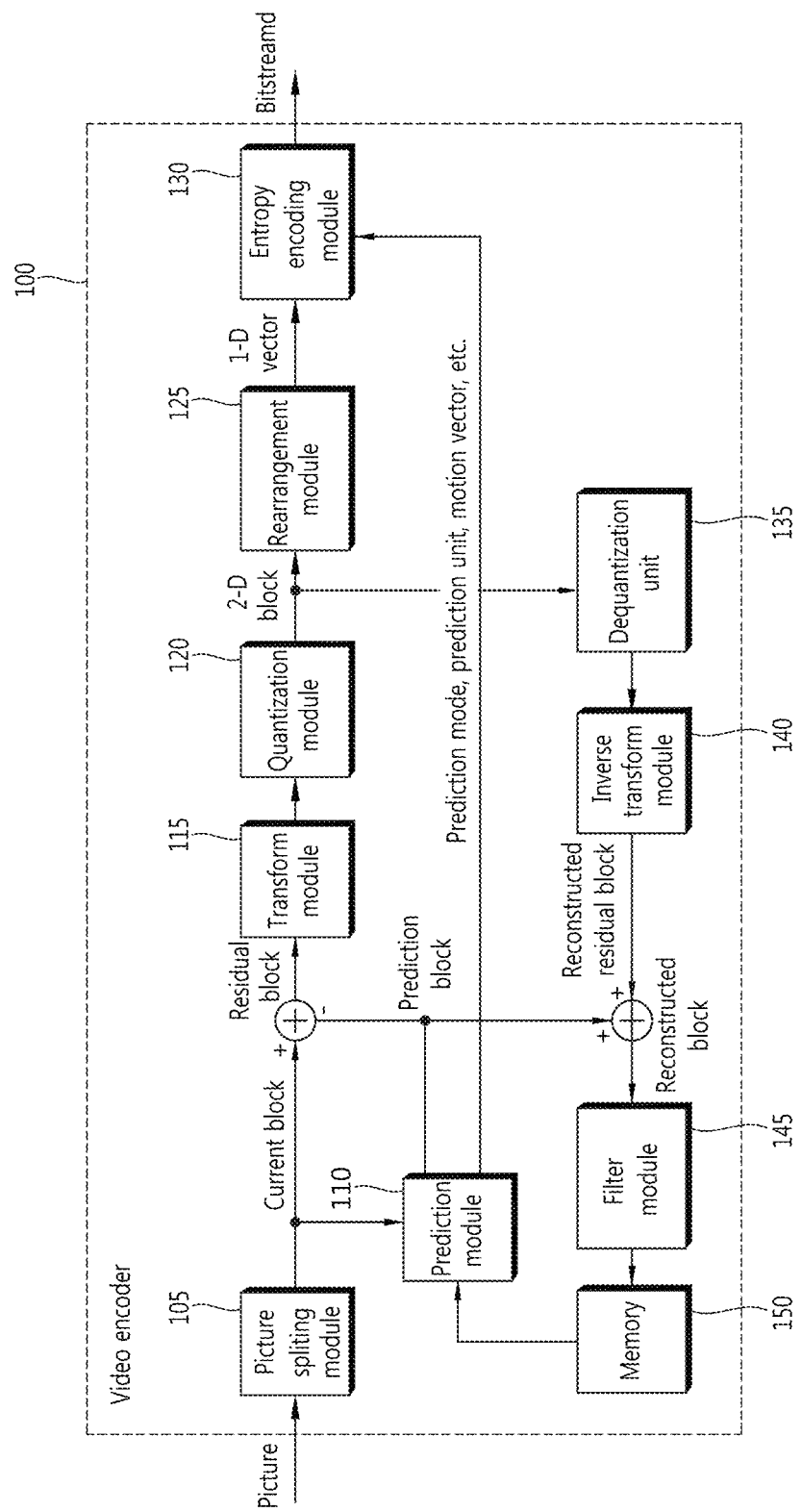
FIG. 1 is a block diagram schematically showing an encoder (or a video encoder) according to an embodiment of the present invention.

The present invention may be modified in various ways and may have several embodiments. Specific embodiments of the present invention are illustrated in the drawings and described in detail in the detailed description. However, the present invention is not intended to be limited to the specific embodiments. The terms used in this application are used to only describe the specific embodiments and are not intended to restrict the present invention. An expression of the singular number includes an expression of the plural number unless clearly defined otherwise in the context. In this application, terms, such as "comprise" and 'have", are intended to designate that characteristics, numbers, steps, operations, elements, or parts which are described in the specification, or a combination of them exist, and should be understood that they exclude the existence or possible addition of one or more other characteristics, numbers, steps, operations, elements, parts, or combinations of them in advance.

Meanwhile, elements in the drawings described in the present invention are independently shown for convenience of description regarding different characteristic functions in a video encoder and a video decoder, but are not meant that each of the elements is implemented as separate hardware or separate software. For example, two or more of the elements are merged into one element, and one of the elements may be classified into a plurality of elements. Embodiments of the integration of elements and/or the separation of one element fall within the scope of the present invention unless they do depart from the essence of the present invention.

Hereinafter, preferred embodiments of the present invention will be described in detail with reference to the accompanying drawings. The same reference numerals designate the same elements throughout the drawings, and a redundant description of the same elements is omitted.

FIG. 1 is a block diagram schematically showing an encoder (or a video encoder) according to an embodiment of the present invention. Referring to FIG. 1, the video encoder 100 includes a picture splitting module 105, a prediction module 110, a transform module 115, a quantization module 120, a re-arrange module 125, an entropy encoding module 130, a dequantization module 135, an inverse transform module 140, a filter module 145, and a memory 150.

The picture splitting module 105 may split a received picture in at least one processing unit. Here, the processing unit may be a Prediction Unit (hereinafter referred to as a 'PU'), a Transform Unit (hereinafter referred to as a 'TU'), or a Coding Unit (hereinafter referred to as a 'CU').

The prediction module 110, as will be described later, may include an inter-prediction module for performing inter-prediction and an intra-prediction module for performing intra-prediction. The prediction module 110 generates a prediction block by performing prediction on the processing unit of a picture in the picture splitting module 105. The processing unit of a picture in the prediction module 110 may be the CU, the TU, or the PU. Furthermore, the prediction module 110 may determine whether prediction performed on a relevant processing unit is inter-prediction or intra-prediction and may determine the details (e.g., a prediction mode) of each prediction method. Here, the processing unit and the prediction method on which prediction is performed may differ from a processing unit on which the detailed contents of a prediction method are determined. For example, the prediction method, the prediction mode, etc. may be determined in the PU, and prediction may be performed in the TU.

A prediction block may be generated by performing prediction on the basis of information about at least one of a picture anterior to the current picture and a picture posterior to the current picture through inter-prediction. Furthermore, a prediction block may be generated by performing prediction on the basis of information about a pixel within the current picture through intra-prediction.

A skip mode, a merge mode, a Motion Vector Prediction (MVP) mode, etc. may be used as the inter-prediction method. In the inter-prediction method, a reference picture may be selected for the PU, and a reference block having the same size as the PU may be selected. The reference block may be selected by an integer pixel unit. Next, a prediction block having a minimum residual signal and a minimum motion vector size for a current PU is derived.

The prediction block may be generated in the unit of an integer sample and may be selected in the unit of an integer pixel or less, such as a ½ pixel unit or a ¼ pixel unit. Here, the motion vector may also be represented in the unit of an integer pixel or less. For example, a luma sample may be represented in the unit of a ¼ pixel, and a chroma sample be represented in the unit of a ⅛ pixel.

Pieces of information, such as an index of a reference picture, a motion vector (e.g., a motion vector predictor) selected through the inter-prediction, and a residual signal, are subject to entropy encoding and then transferred to a video decoder.

If intra-prediction is performed, the prediction mode may be determined in the PU and prediction may be performed in the PU. Furthermore, the prediction mode may be determined in the PU, and intra-prediction may be performed in the TU.

In intra-prediction, the prediction mode may have 33 directional prediction modes and two or more non-directional modes. The non-directional mode may include a DC prediction mode and a planar mode.

In intra-prediction, after a filter is applied to a reference sample, a prediction block may be generated. Here, whether a filter will be applied to a reference sample may be determined depending on the intra-prediction mode and/or size of the current block.

The PU may have various sizes and forms. For example, in the inter-prediction method, the PU may have a size, such as 2N×2N, 2N×N, N×2N, or N×N (N is an integer), etc. In the intra-prediction method, the PU may have a size, such as 2N×2N or N×N, etc. Here, the PU having the size N×N may be set so that it is applied to specific cases. For example, the PU having the size N×N may be set so that it is applied to a CU having a minimum size or may be set so that it is applied to only intra-prediction. Furthermore, in addition to the PUs having the above sizes, the PU having a size, such as N×mN, mN×N, 2N×mN, or mN×2N (m<1) may be further defined and used.

A residual value (or a residual block or a residual signal) between the generated prediction block and an original block is inputted to the transform module 115. Furthermore, information about the prediction mode, information about the motion vector, etc. which used for prediction, together with the residual value, are encoded by the entropy encoding module 130 and then transferred to a video decoder.

The transform module 115 generates a transform coefficient by performing a transform on the residual block in the unit of a transform. The unit of a transform in the transform module 115 may be the TU, and it may have a quad tree structure. Here, the size of the unit of a transform may be determined within a range of a specific maximum and minimum size. The transform module 115 may transform the residual block by using Discrete Cosine Transform (DCT) and/or Discrete Sine Transform (DST).

The quantization module 120 may generate a quantization coefficient by quantizing the residual values transformed by the transform module 115. A value calculated by the quantization module 120 is provided to the dequantization module 135 and the re-arrange module 125.

The re-arrange module 125 re-arranges the quantization coefficients provided by the quantization module 120.

Encoding efficiency in the entropy encoding module 130 may be improved by re-arranging the quantization coefficients. The re-arrange module 125 may re-arrange the quantization coefficients of a 2-dimensional (2-D) block form in a 1-D vector form by using a coefficient scanning method. The re-arrange module 125 may change order of coefficient scanning on the basis of probability statistics of the coefficients transmitted by the quantization module 120 in order to improve entropy encoding efficiency in the entropy encoding module 130.

The Entropy encoding module 130 may perform entropy encoding on the quantization coefficients re-arranged by the re-arrange module 125. Encoding methods, such as exponential Golomb, Context-Adaptive Variable Length Coding (CAVLC), and Context-Adaptive Binary Arithmetic Coding (CABAC), may be used as the entropy encoding. The entropy encoding module 130 may encode various pieces of information, such as information about a quantization coefficient and the block type of CU, prediction mode information, splitting unit information, PU information and transmission unit information, motion vector information, reference picture information, information about the interpolation of a block, and filtering information which are received from the re-arrange module 125 and the prediction module 110.

Furthermore, the entropy encoding module 130 may change a parameter set or syntax to some extent if necessary.

The dequantization module 135 may perform dequantization on the values quantized by the quantization module 120, and the inverse transform module 140 performs an inverse transform on the values inversely quantized by the dequantization module 135. The residual values generated by the dequantization module 135 and the inverse transform module 140 and the prediction block predicted by the prediction module 110 are added, thereby being capable of generating a reconstructed block.

An example in which a reconstructed block is generated by adding a residual block and a prediction block using an adder is shown in FIG. 1. Here, the adder may be considered as an additional unit (i.e., a reconstructed block generation unit) for generating the reconstructed block.

The filter module 145 may apply a deblocking filter, an Adaptive Loop Filter (ALF), and a Sample Adaptive Offset (SAO) to a reconstructed picture.

The deblocking filter may remove distortion generated at the boundary of blocks in the reconstructed picture. The Adaptive Loop Filter (ALF) may perform filtering on the basis of a value obtained by comparing a reconstructed picture with an original picture after a block is filtered by the deblocking filter. The ALF may be performed only when high efficiency is used. The SAO is used to restore a difference between a reconstructed block to which the deblocking filter has been applied and an original picture in the unit of a pixel, and the SAO is applied in the form of a band offset or an edge offset.

Meanwhile, the filter module 145 may not apply filtering on a reconstructed block used in inter-prediction.

The memory 150 may store the reconstructed block or picture derived by the filter module 145. The reconstructed block or picture stored in the memory 150 may be provided to the prediction module 110 for performing inter-prediction.

Figure 2:
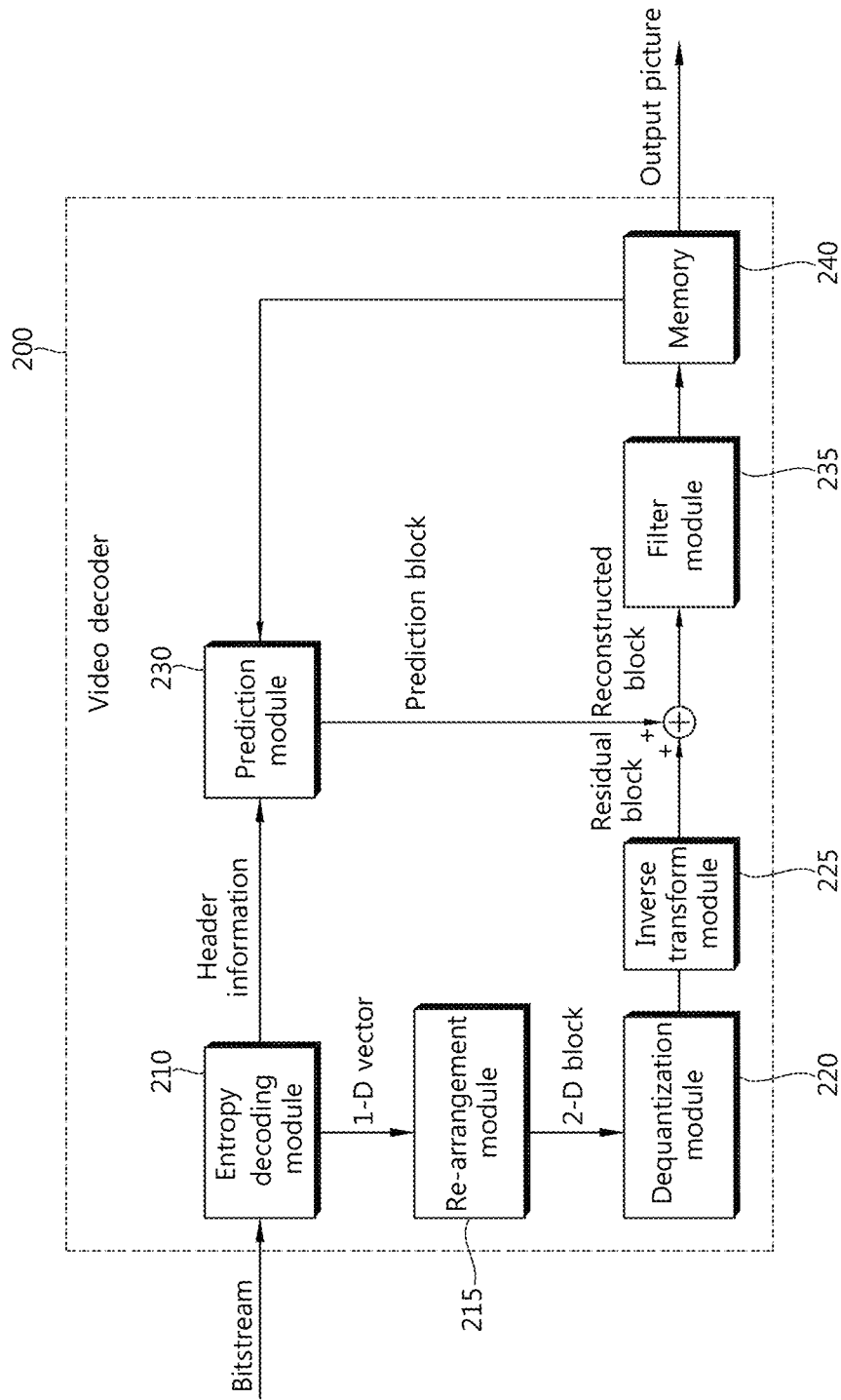
FIG. 2 is a block diagram schematically showing a video decoder according to an embodiment of the present invention.

FIG. 2 is a block diagram schematically showing a video decoder according to an embodiment of the present invention. Referring to FIG. 2, the video decoder 200 may include an entropy decoding module 210, a re-arrange module 215, an dequantization module 220, an inverse transform module 225, a prediction module 230, a filter module 235, and memory 240.

If a VIDEO bitstream is received from a video encoder, the inputted bitstream may be decoded according to a procedure in which video information has been processed in the video encoder.

For example, if Variable Length Coding (hereinafter referred to as 'VLC'), such as CAVLC, has been used in a video encoder in order to perform entropy encoding, the entropy decoding module 210 may implement the same VLC table as a VLC table used in the video encoder and perform entropy decoding. Furthermore, if CABAC has been used in a video encoder in order to perform entropy encoding, the entropy decoding module 210 may perform entropy decoding using CABAC.

Information necessary to generate a prediction block, from among pieces of information decoded by the entropy decoding module 210, is provided to the prediction module 230. A residual value on which entropy decoding has been performed by the entropy decoding module 210 may be inputted to the re-arrange module 215.

The re-arrange module 215 may re-arrange bitstreams on which entropy decoding has been performed by the entropy decoding module 210 by using a method of re-arranging the bitstreams in a video encoder. The re-arrange module 215 may re-arrange coefficients represented in a 1-D vector by restoring the coefficients in coefficients of a 2-D block form. The re-arrange module 215 receives pieces of information related to coefficient scanning performed in a video encoder and may re-arrange the pieces of information using a method of inversely scanning the pieces of information on the basis of scanning order performed in the video encoder.

The dequantization module 220 may perform dequantization on the basis of a quantization parameter and coefficient values of a re-arranged block received from a video encoder.

The inverse transform module 225 may perform an inverse DCT and/or an inverse DST on a DCT and a DST performed by the transform module of a video encoder in relation to the results of quantization performed by the video encoder. An inverse transform may be performed in the unit of transmission or in the splitting unit of a picture which has been determined in the video encoder. In the transform module of a video encoder, a DCT and/or a DST may be selectively performed based on a plurality of pieces of information, such as a prediction method, the size of the current block, and a prediction direction. The inverse transform module 225 of the video decoder may perform an inverse transform on the basis of transform information performed in the transform module of a video encoder.

The prediction module 230 may generate a prediction block on the basis of information about the prediction block provided by the entropy decoding module 210 and information about a previously decoded block and/or picture provided by the memory 240.

If a prediction mode for the current PU is an intra-prediction mode, intra-prediction for generating the prediction block may be performed on the basis of information about pixels within the current picture.

If a prediction mode for the current PU is an inter-prediction mode, inter-prediction may be performed on the current PU on the basis of information included in at least one of a picture anterior to the current picture and a picture posterior to the current picture. Here, motion information, for example, a motion vector and information about a reference picture index which are necessary for the inter-prediction of the current PU and provided by a video encoder may be derived after checking a skip flag, a merge flag, etc. received from the video encoder.

A reconstructed block may be generated by using a prediction block generated by the prediction module 230 and a residual block provided by the inverse transform module 225. An example in which a reconstructed block is generated by adding a prediction block and a residual block using an adder is illustrated in FIG. 2. Here, the adder may be considered as an additional unit (i.e., a reconstructed block generation unit) for generating the reconstructed block.

The reconstructed block and/or picture may be provided to the filter module 235. The filter module 235 applies a deblocking filtering, a Sample Adaptive Offset (SAO) and/or adaptive loop filtering to the reconstructed block and/or picture.

The memory 240 stores the reconstructed picture and/or block so that it is used as a reference picture and/or a reference block and also provides the reconstructed picture to an output unit.

Meanwhile, as described above, the filter module of each of the video encoder and the video decoder is an in-loop filter. A deblocking filter, a Sample Adaptive Offset (SAO) filter, an Adaptive Loop Filter (ALF) may be used as the filter module.

The deblocking filter removes artifacts between blocks according to the prediction, transform, and quantization of a block unit. The deblocking filter is applied to a PU edge or a TU edge, and it may set a minimum block size to which the deblocking filter will be applied.

In order to apply the deblocking filter, the Boundary Strength (BS) of a horizontal or vertical filter boundary is first determined. If whether filtering will be performed on the basis of the BS is determined for each block, what filter is be used may be determined. The filter to be applied may be a weak filter or a strong filter. The filtering module applies the selected filter to the boundary of a relevant block.

An Adaptive Loop Filter (ALF) may also be applied after an SAO is performed. The ALF is used to compensate for coding errors by using a Wiener filter and is globally applied within a slice unlike the SAO. The ALF may be applied only in case of High Efficiency (HE).

The SAO is a procedure of restoring a difference between a picture on which deblocking filtering has been performed and an original picture in the unit of a pixel. A coding error may be compensated for through the SAO. The coding error may be caused by quantization, etc. As described above, the SAO includes two types; a band offset and an edge offset.

Figure 3:
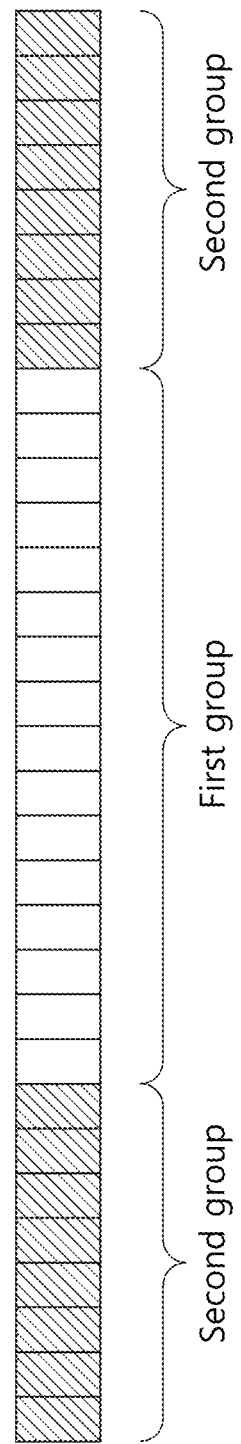
FIG. 3 is a diagram schematically illustrating a band offset.

FIG. 3 is a diagram schematically illustrating a band offset.

In order to apply a band offset, pixels within the unit of SAO application may be classified according to the intensity of each pixel, that is, a pixel value. The intensity range of a pixel, that is, a range of pixel values, may be classified into a specific number of intensity intervals (i.e., the interval of pixel values), that is, a specific number of bands. (In this specification, terms a 'pixel value' and the 'intensity of a pixel' are used interchangeably for convenience of description. The 'pixel value' and the 'intensity of a pixel' may be interpreted as having the same meaning or the 'pixel value' may be interpreted as having a meaning including the 'intensity of a pixel'). A value of an offset applied to each pixel may be set for each band. An offset of a band to which a pixel value belongs may be applied to a pixel.

Regarding a picture having N bit pixels, the entire pixel range (intensity range) may become 0 to $2^N-1$. For example, an 8-bit pixel may have a pixel range of 0 to 255. FIG. 3 illustrates an example in which the entire range of pixel values (intensity range) is divided into 32 bands having the same interval of pixel values.

Referring to FIG. 3, the intensity interval of each band is 8. The 32 bands may be split into a first group at the center and second group on the sides. If the groups include the same number of bands, the first group may include 16 bands and the second group may include 16 bands. An offset is applied to each band, and an offset value for each band may be transmitted to the video decoder.

The video decoder classifies pixels according to the same process as that of applying a band offset in the video encoder and applies the transmitted offset value to a pixel depending on a band to which the pixel belongs.

Meanwhile, as described above, a method of adaptively applying a band offset may be taken into consideration, instead of the method of classifying 32 bands into two groups and setting an offset for each band. For example, a method of effectively applying a band offset may be taken into consideration by differently setting the interval of a band to which the band offset will be applied depending on the unit of SAO application for applying an SAO, or selectively indicating a band to which the band offset will be applied, or increasing the number of groups to which a band offset to be applied.

A method of adaptively applying a band offset in a system to which the present invention is applied is described below.

FIG. 4 shows examples of histograms for a picture according to characteristics of the picture. More particularly, FIG. 4 shows various examples of histograms of luma and chroma components according to image characteristics for each partial image in a picture of FIG. 4A.

Figure 4A:
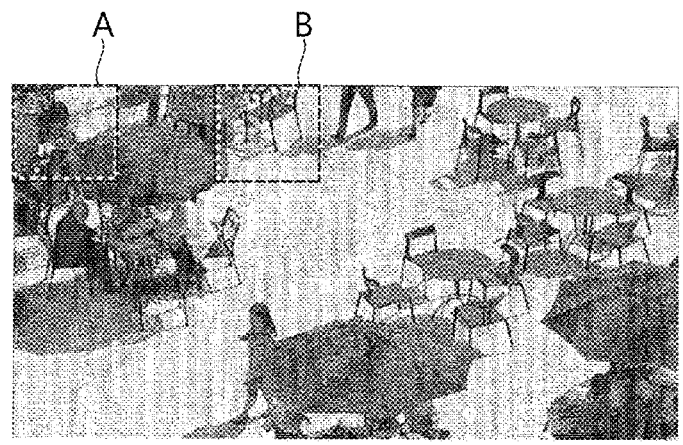
FIGS. 4A to 4D show local distributions of histograms for the same picture.
Figure 4B:
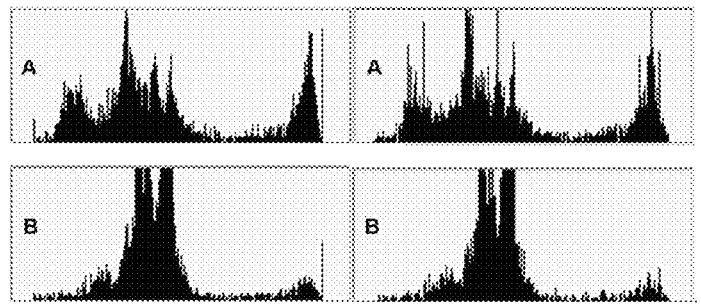

For example, regarding a region A and a region B of FIG. 4A, two histograms placed on the upper and lower sides on the left side of FIG. 4B indicate luma component histograms of original pictures, and two histograms placed on the upper and lower sides on the right side of FIG. 4B indicate luma component histograms of reconstructed pictures.

Figure 4C:
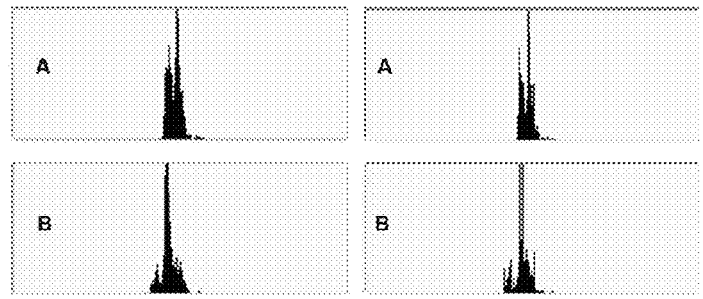

Regarding the region A and the region B of FIG. 4A, two histograms placed on the upper and lower sides on the left side of FIG. 4C indicate chroma (Cr) component histograms of original pictures, and two histograms placed on the upper and lower sides on the right side of FIG. 4C indicate chroma (Cr) component histograms of reconstructed pictures.

Figure 4D:
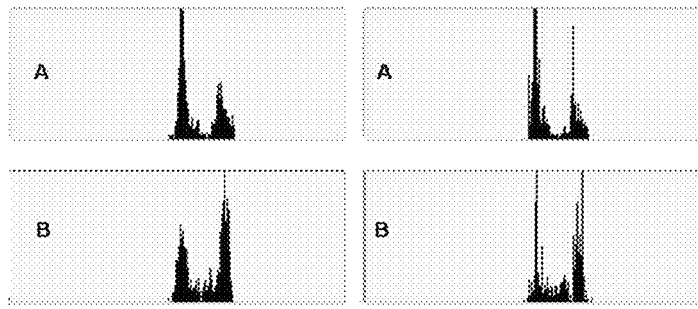

Furthermore, regarding the region A and the region B of FIG. 4A, two histograms placed on the upper and lower sides on the left side of FIG. 4D indicate chroma (Cb) component histograms of original pictures, and two histograms placed on the upper and lower sides on the right side of FIG. 4D indicate chroma (Cb) component histograms of reconstructed pictures.

Referring to FIG. 4, it can be seen that different picture characteristics are shown depending on regions even within the same picture and histograms have various distributions depending on the characteristics of images for each region. Accordingly, video quality and compression efficiency can be improved by adaptively applying a band offset to a unit region (i.e., an SAO unit) to which an SAO is applied.

The video encoder or the video decoder may adaptively divided a range of pixel values (a pixel range) and apply a band offset. That is, a range of intensity of a pixel (an intensity range of a pixel), which a pixel may have, may be divided adaptively or variably and a band section may be set thereon.

For example, if a histogram for an image of a block is concentrated on the central part of a range of pixel values, bands each having a narrow interval may be set by further minutely classifying the central part of range of pixel values and bands each having a bigger interval may be set by less classifying the side parts of the range of pixel values.

More particularly, regarding a pixel of N bits, if a distribution of pixels corresponding to the central part of the entire range of pixel values (0 to $2^N-1$) is large, M bands each having a small intensity interval, that is, a small pixel value interval, may be set in the central part, and L bands each having a great intensity interval (i.e., a great pixel value section) may be set in the side parts of the entire range of pixel values. Here, M and L may be set to have the same value or different values.

In contrast, if a histogram for an image of a block is concentrated on the side parts of the entire range of pixel values, a method of setting bands by further minutely classifying the side parts and setting bands by less classifying the central part of the entire range of pixel values may be taken into consideration.

More particularly, regarding a pixel of N bits, if a distribution of pixels corresponding to the side parts of the entire intensity range (0 to $2^N-1$) is large, M bands each having a small intensity interval, that is, a small pixel value section, may be set in the side parts and L bands each having a great intensity interval (i.e., a great pixel value interval) may be set in the central part of the entire intensity range. Here, M and L may be set to have the same value or different values.

Figure 5:
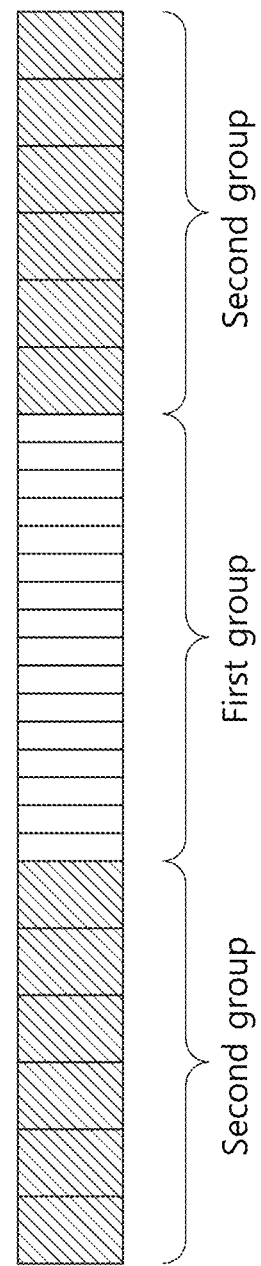
FIGS. 5 to 7 are diagrams schematically illustrating an example of a method of classifying the entire pixel range adaptively or variably and applying a band offset.

FIG. 5 is a diagram schematically illustrating an example of a method of classifying the entire range of pixel values adaptively or variably and applying a band offset. FIG. 5 shows an example in which pixels corresponding to the central part of the pixel value range (range of pixel values) are many.

In the example of FIG. 5, assuming that a range of pixel values is 256 (0 to $2^8-1$), a first group in the central part of the range of pixel values may be minutely divided into 16 bands by using 4 pixel values as one band and second groups in the side parts of the pixel range may be divided into 12 bands by using 16 pixel values as one band.

Furthermore, if a histogram for an image of a block is concentrated on the side parts of the entire range of pixel values, unlike in the example of FIG. 5, the first group in the central part of the range of pixel values may be divided into 12 bands by using 16 pixel value as one band and second groups in the side parts of the range of pixel values may be divided into 16 bands by using 4 pixel values as one band.

Figure 6:
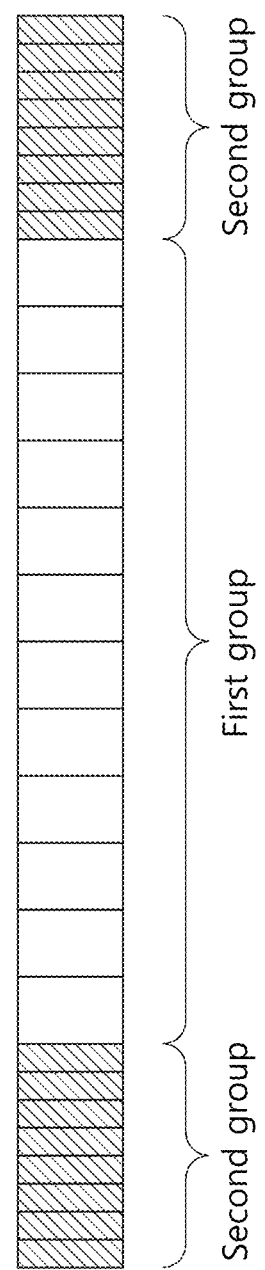

FIG. 6 is a diagram schematically illustrating another example of a method of classifying the entire pixel range adaptively or variably and applying a band offset. FIG. 6 shows an example in which pixels corresponding to the side parts of the entire pixel value range are many.

Meanwhile, a method of classifying the entire range of pixel values into more band groups depending on the SAO application unit without classifying the entre range of pixel values into two band groups may be used. A picture reconstruction effect may be improved because the entire range of pixel values may be divided more densely and an offset may be applied. For example, bands are not divided into two groups, but are divided into N groups so that the video encoder may provide more minute offset information to some pixel value ranges. Accordingly, the video decoder may receive more minute offset information about some pixel value range from the video encoder and apply a further minute offset depending on a pixel value range.

Figure 7:
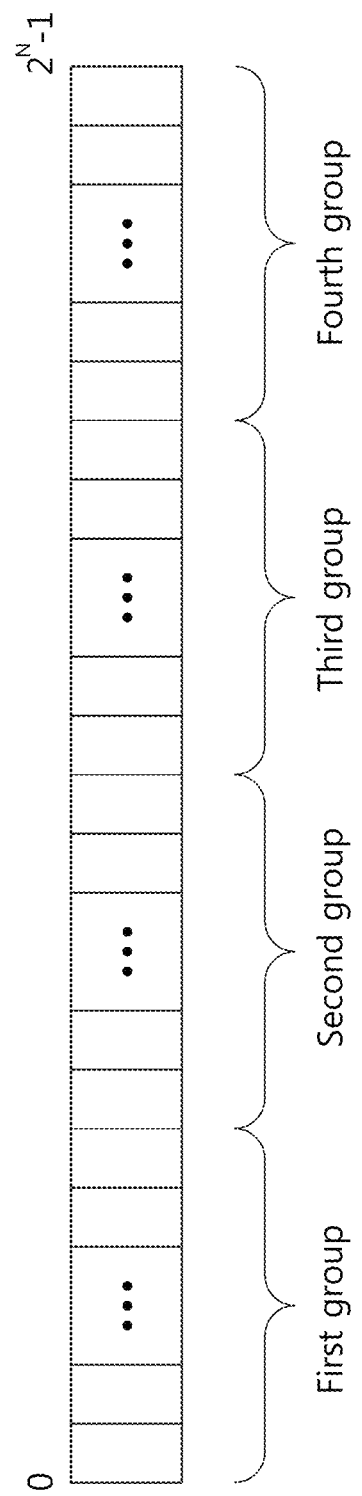

FIG. 7 is a diagram schematically illustrating yet another example of a method of classifying a range of pixel values for all pixels adaptively or variably and applying a band offset.

The example of FIG. 7 illustrates that the entire range of pixel values is divided into a specific number of bands, the bands are divided into four groups, and a band offset is applied.

For example, in FIG. 7, if N is 8, that is, bits allocated to a pixel value is 8 bits, the entire range of pixel values may be 256 values of 0 to 255. If the entire range of pixel values is divided into 32 bands and four groups having the same number of bands are set, each of the groups includes 8 bands and each of the bands has a interval of 8 pixel values.

If the entire range of pixel values is divided into more groups not two groups and information about the offset of each group is transmitted, local characteristics of a picture can be incorporated better. Meanwhile, if a range of pixel values, that is, a range of intensity, covered by each group is fixed when a band offset is applied, relevant information is transmitted although the number of times of band occurrence within a group (i.e., the number of pixels corresponding to a specific band or the number of times of offset application corresponding to a specific band) is small or a value of a band offset for a relevant band is 0. In this case, to send the relevant information increases the amount of information transmitted and also the complexity of an overall system.

In order to prevent the problems, the video encoder may transmit a range of a band offset to be used in the current picture. That is, the video encoder may transmit a range or interval of bands corresponding to a band offset to be used in the current picture.

More particularly, if a band offset is applied, the video encoder may transmit information to specify bands that cover a range of pixel values to which a band offset may be applied and information about offset values for the bands to the video decoder. The video encoder may specify bands that may cover a range of pixel values to which the band offset may be applied or may specify bands that cover only a range of pixel values to which the band offset may be applied. Accordingly, information about transmitted bands may be information about intervals of bands including bands that cover a range of pixel values to which the band offset may be applied or may be information to specify a band interval that covers only a range of pixel values to which the band offset may be applied.

The video decoder receives the information to specify bands that cover a range of pixel values to which the band offset may be applied and information about offset values for the bands from the video encoder. If a band offset is applied, the video decoder determines whether a pixel value of a target pixel belongs to a pixel value range of bands to which the band offset may be applied. If, as a result of the determination, it is determined that the pixel value of the target pixel belongs to the range of pixel values of bands to which the band offset may be applied, the video decoder may apply an offset, corresponding to a band to which the pixel value of the target pixel belongs, to the target pixel. Since bands that cover a range of pixel values to which a band offset may be applied are specified and values of offsets to be applied to only the specified bands are transmitted, the offset may not be applied to bands other than the specified bands or a value of the offset for the bands other than the specified bands may be set to 0.

For example, the video encoder may transfer information, indicating which interval of pixel values the band offset may be applied to in the current picture, to the video decoder. If the offsets of the current picture are frequently applied in a specific range of pixel values (e.g., intensities), the video encoder may send information indicating bands that cover the corresponding range to the video decoder. That is, if a band offset is used in bands having uniform intervals, the first band at which the application of the band offset begins and the number of bands to which the band offset may be applied may be specified, a last band at which the application of the band offset ends and the number of bands to which the band offset may be applied are designated, or the first band at which the application of the band offset begins and the last band at which the band offset ends may be specified. In this case, information about unnecessary offsets can be prevented from being transmitted or unnecessary offsets can be prevented from being performed.

Figure 8:
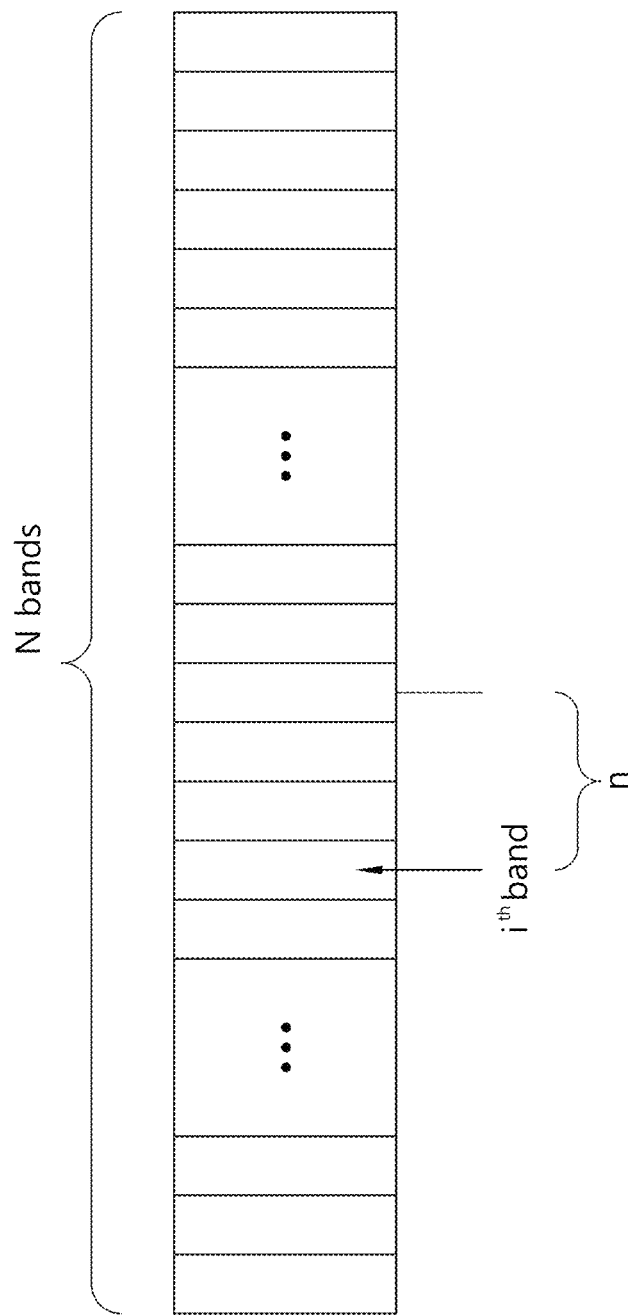
FIG. 8 is a diagram schematically illustrating an example of a method of indicating bands to which a band offset may be applied according to the present invention.

FIG. 8 is a diagram schematically illustrating an example of a method of specifying or indicating bands to which a band offset may be applied according to the present invention. The example of FIG. 8 illustrates a method of indicating the first band of bands that cover a range of pixel values to which a band offset may be applied.

Referring to FIG. 8, if the number of bands that cover a range of pixel values to which a band offset may be applied, from among all N bands, is n, the video encoder sends information indicating the first band, from among n bands, to the video decoder.

For example, it is assumed that a band including a pixel value of 0 in the entire range of pixel values is called a zeroth band and a band including the maximum pixel value in the entire range of pixel values is called an $(N-1)^{th}$ band. The video encoder may send information indicating an $i^{th}$ band, that is, the first band among n bands that cover a range of pixel values to which a band offset may be applied, and information about the offsets for the n bands to the video decoder. The video decoder receives the information indicating the $i^{th}$ band and the information about the offsets for the n bands from the video encoder. If the current picture or pixels now within the current SAO application unit have a pixel value corresponding to any one of the n bands, and the video decoder may apply the band offset to each of the pixels depending on the pixel value.

In the example of FIG. 8, if the entire range of pixel values is 0 to 256 and the number of all bands is 32, the video encoder may indicate the first band of bands that cover a range of pixel values to which a band offset may be applied, from among a zeroth band to a thirty-first band. Here, a value of n might have been previously determined between the video encoder and the video decoder. If the number of bands that cover a range of pixel values to which a band offset may be applied is 4 and the first band of the 4 bands is a $i^{th}$ band, the video encoder may send a band offset value for $i^{th}$, $(i+1)^{th}$, $(i+2)^{th}$, and $(i+3)^{th}$ bands, together with information indicating the $i^{th}$ band, to the video decoder.

Figure 9:
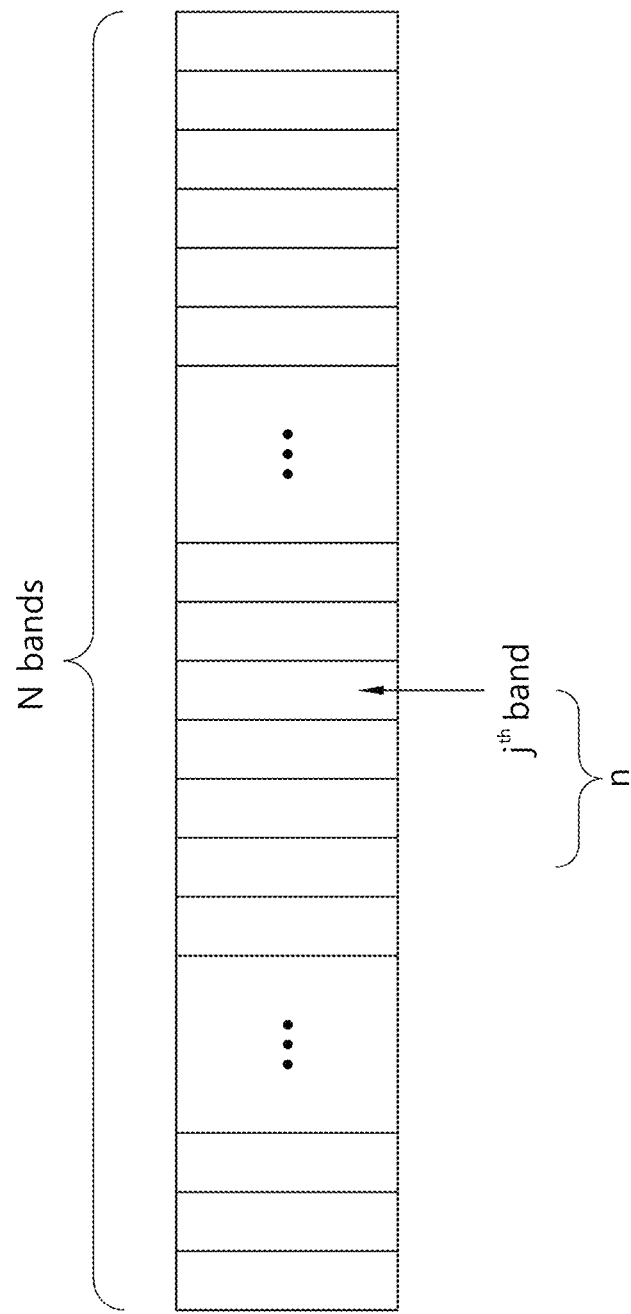
FIG. 9 is a diagram schematically illustrating another example of a method of indicating bands to which a band offset will be applied according to the present invention.

FIG. 9 is a diagram schematically illustrating another example of a method of indicating bands to which a band offset may be applied according to the present invention. The example of FIG. 9 illustrates a method of indicating the last band of bands that cover a range of pixel values to which the band offset will be applied.

Referring to FIG. 9, if the number of bands that cover a range of pixel values to which a band offset may be applied, from among all N bands, is n, the video encoder sends information specifying the last band of the n bands in all the N bands to the video decoder.

For example, it is assumed that a band including a pixel value of 0 in the entire pixel range is a zeroth band and a band including the maximum pixel value in the entire range of pixel values is an $(N-1)^{th}$ band. The video encoder may transmit information indicating a $j^{th}$ band, that is, the last band of the n bands that cover a range of pixel values to which a band offset may be applied and information about the offsets for the n bands to the video decoder. The video decoder receives the information indicating the $j^{th}$ band and the information about the offsets for the n bands from the video encoder. The current picture or pixels now within the SAO application unit have a pixel value corresponding to any one of the n bands, and the video decoder may apply the band offset to each of pixels depending on a value of the pixel.

In the example of FIG. 9, if the entire range of pixel values is 0 to 256 and the number of all the bands is 32, the video encoder may specify the last band of the bands that cover a range of pixel values to which the band offset may be applied, from among the zeroth band to the thirty-first band. Here, a value of n might have been previously determined between the video encoder and the video decoder. If the number of bands that cover a range of pixel values to which a band offset may be applied is 4 and the last band of the 4 bands is a $j^{th}$ band, the video encoder may signal a band offset value for $j^{th}$, $(j-2)^{t}$, and $(j-3)^{th}$ bands, together with information indicating the $j^{th}$ band, to the video decoder.

Figure 10:
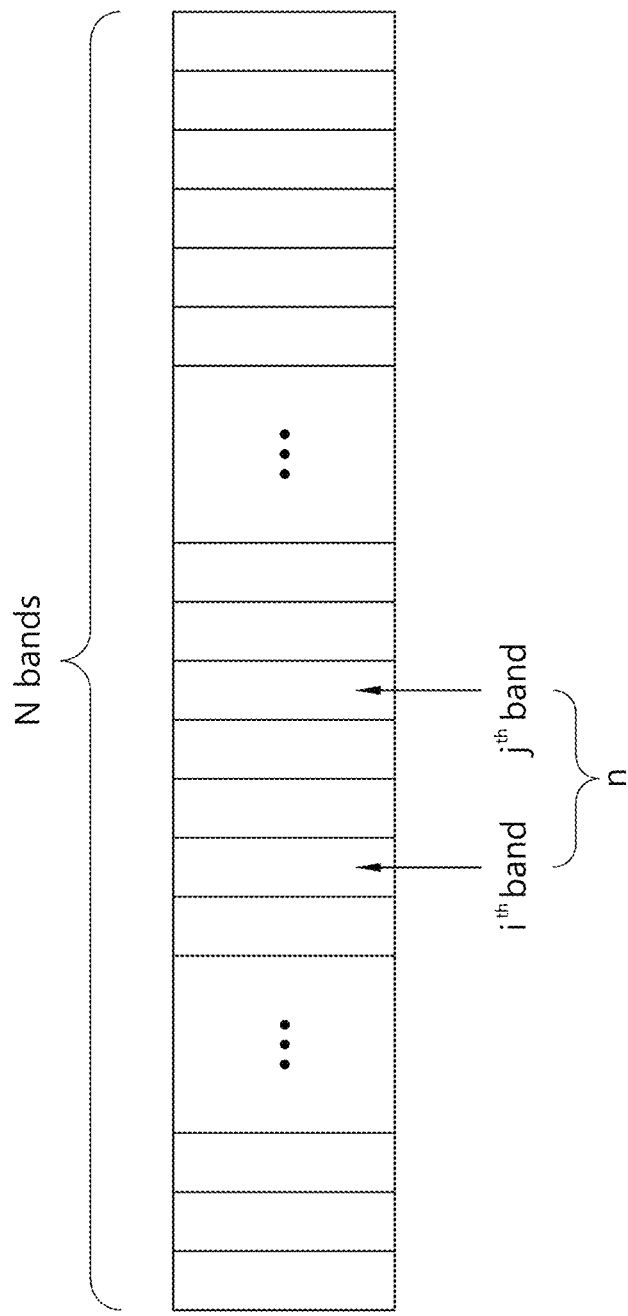
FIG. 10 is a diagram schematically illustrating yet another example of a method of indicating bands to which a band offset will be applied according to the present invention.
Figure 11A:
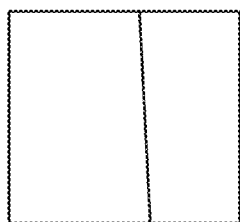
FIGS. 11A to 11D show examples of the type of representative edges that may appear for each direction within a block.
Figure 11B:
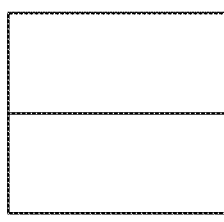
Figure 11C:
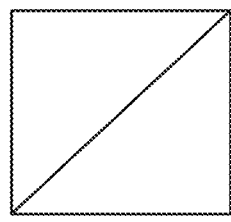
Figure 11D:
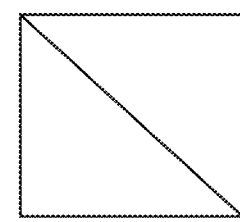
Figure 12A:
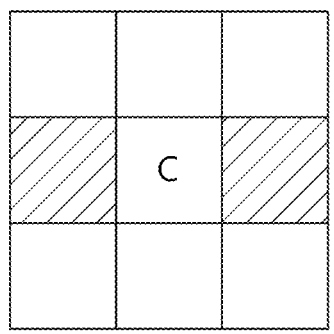
FIGS. 12A to 12D show four edge types of an edge offset on the basis of the current pixel C.
Figure 12B:
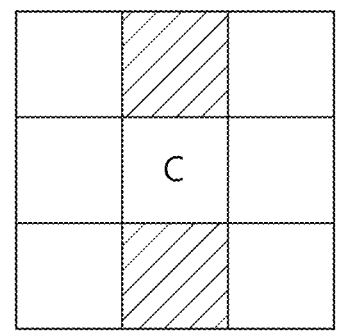
Figure 12C:
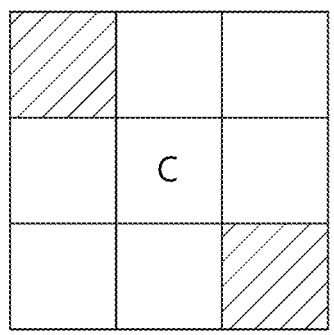
Figure 12D:
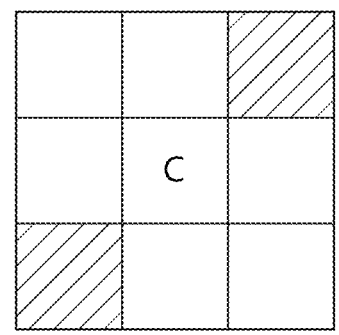

FIG. 10 is a diagram schematically illustrating yet another example of a method of specifying bands to which a band offset may be applied according to the present invention. The example of FIG. 10 illustrates a method of indicating a first band (i.e., a start band) and a last band (i.e., an end band), from among bands that cover a range of pixel values to which the band offset may be applied.

Referring to FIG. 10, if the number of bands that cover a range of pixel values to which a band offset may be applied, from among all N bands, is n, the video encoder transmits information indicating the first band and the last band of the n bands to the video decoder.

For example, it is assumed that a band including a pixel value of 0 in the entire range of pixel values is a zeroth band and a band including the maximum pixel value in the entire range of pixel values is an $(N-1)^{th}$ band. The video encoder may send information indicating an $i^{th}$ band, that is, the first band, and a $j^{th}$ band, that is, the last band, from among the n bands that cover a range of pixel values to which the band offset may be applied, and information about the offsets for the n bands to the video decoder. The video decoder receives the information indicating the $i^{th}$ band and the $j^{th}$ band and the information about the offsets for the n bands from the video encoder. If the current picture or pixels now within the SAO application unit have a pixel value corresponding to any one of the n bands, and the video decoder may apply the band offset to each of the pixels depending on a value of the pixel.

In the example of FIG. 10, if the entire range of pixel values is 0 to 256 and the number of all the bands is 32, the video encoder may indicate the first band and the last band of the bands that cover a range of pixel values to which the band offset may be applied, from among the zeroth band to the thirty-first band. If the number of bands that cover a range of pixel values to which the band offset may be applied is 4 and the first band of the 4 bands is an $i^{th}$ band and the last band of the 4 bands is a $j^{th}$ band, the video encoder may send information indicating the $i^{th}$ band and the $j^{th}$ band and a band offset values for the $i^{th}$, $(i+1)^{th}$, $(i+2)^{th}$, $(i+3(=j))^{th}$ bands to the video decoder.

Here, the number of bands n that cover a range of pixel values to which the band offset may be applied might have been previously determined between the video encoder and the video decoder. Furthermore, in the case that the first band and the last band, from among the bands to which the band offset may be applied, are indicated, the video encoder may determine a range of pixel values to which the band offset may be applied and variably specify the number of bands to which the band offset may be applied.

It is assumed that the entire range of pixel values is 0 to 256, the number of all the bands is 32, and each of the bands have an equal interval of 8 pixel values. If offsets are frequently applied to the pixel value ranges 32 and 160 in the current picture, bands that cover a range of pixel values to which the band offset may be applied become a fourth band to a twentieth band, from among the zeroth band to the thirty-first band. The video encoder may transmit information indicating the first band and the last band (e.g., band_start and band_end), from among the bands to which the band offset may be applied, to the video decoder. If the band offset is applied to the bands from fourth band to the twentieth band of all the bands, information about band_start=4 and band_end=20 may be transmitted from the video encoder to the video decoder.

In the examples of FIGS. 8 to 10, the video encoder may set the intervals of bands that cover a range of pixel values to which a band offset may be applied, that is, bands to which the band offset may be applied for each SAO application unit, for each picture to which an SAO is applied, or for each slice to which the SAO is applied.

Meanwhile, the number of pixels belonging to each band, that is, the number of bands to which a band offset has been applied may be counted. The video encoder may send band offset values for bands having high frequency to the video decoder.

For example, if 32 bands from a zeroth band to a thirty-first band cover the entire range of pixel values and bands having high frequency of application in the entire range of pixel values are 0, 4, 5, 6, 7, 9, 12, 15, 19, 20, 23, and 25, the video encoder may send band offset values for only the bands having high frequency of application to the video decoder, but may not send an offset value to be applied as the band offset regarding bands having low frequency of application.

In this case, the video encoder may further transmit information, indicating that offset values for what bands are transmitted, to the video decoder.

As the second type of the SAO, there is the edge offset in addition to the band offset. The edge offset is applied with consideration taken of information about an edge for each pixel, for example, the direction of an edge based on the current pixel, the intensity of the current pixel and neighboring pixels, etc.

FIG. 11 shows examples of the type of representative edges that may appear for each direction within a block. Referring to FIG. 11, FIG. 11A shows an edge having a direction of 90 degrees, FIG. 11B shows an edge having a direction of 0 degree, FIG. 11C shows an edge having a direction of 45 degrees, and FIG. 11D shows an edge having a direction of 135 degrees.

An edge offset may include four types for a unit for one filtering, that is, for the SAO application unit, according to the angle or direction of an edge. A minimum unit of the SAO application unit may be the Largest Coding Unit (LCU). The four types in the SAO application unit, such as that shown in FIG. 11, are hereinafter called the edge types of an edge offset, for convenience of description.

FIG. 12 shows four edge types of an edge offset on the basis of the current pixel C. Referring to FIG. 12, FIG. 12A shows an edge type of a 1-D 0 degree, FIG. 12B shows an edge type of 1-D 90 degrees, FIG. 12C shows an edge type of 1-D 135 degrees, and FIG. 12D shows an edge type of 1-D 45 degrees.

The edge offset may be used depending on the four edge types shown in FIG. 12.

If an edge type is determined, the edge offset is applied by taking a relation between the current pixel and neighboring pixels into consideration.

FIG. 13 is a diagram schematically illustrating an example in which the intensity of the current pixel is compared with the intensity of each of neighboring pixels and the results of the comparison are classified into four categories. Referring to FIG. 13, FIG. 13A to FIG. 13F show relations between the current pixel C and neighboring pixels for each category.

Figure 13A:
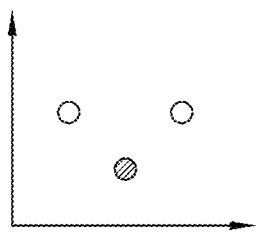
FIGS. 13A to 13F are diagrams schematically illustrating an example in which the intensity of the current pixel is compared with the intensity of each of neighboring pixels and the results of the comparison are classified into four categories.
Figure 13B:
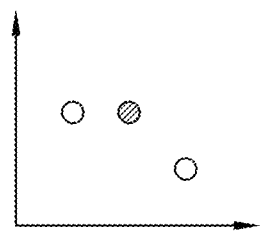
Figure 13C:
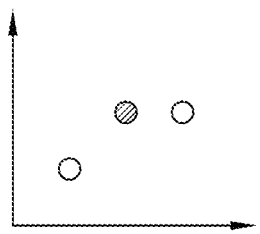
Figure 13D:
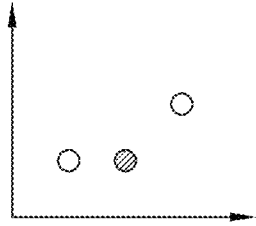
Figure 13E:
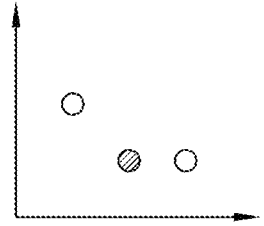

The category shown in FIG. 13A shows an example in which the intensity of each of two pixels neighboring to the current pixel C is greater than the intensity of the current pixel. The categories shown in FIGS. 13B and 13C show examples in each of which the intensity of one of two pixels neighboring to the current pixel is smaller than the intensity of the current pixel. The categories shown in FIGS. 13D and 13E show examples in each of which the intensity of one of two pixels neighboring to the current pixel is greater than the intensity of the current pixel. The category shown in FIG. 13F shows an example in which the intensity of each of two pixels neighboring to the current pixel is smaller than the intensity of the current pixel.

Figure 13F:
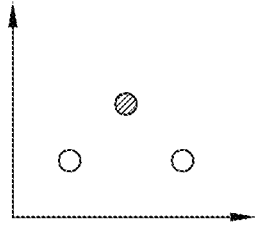

For example, FIGS. 13A and 13F show examples in which the intensity of the current pixel is greater or smaller than the intensity of each of the neighboring pixels. Furthermore, FIGS. 13B to 13E may appear when the current pixel is placed at the boundary of a specific region.

Table 1 shows the four categories shown in FIG. 13.

TABLE 1

| CATOGORY | CONDITION |
|---|---|
| 1 | Intensity of C < intensity of two neighboring pixels |
| 2 | Intensity of C < intensity of one neighboring pixel & Intensity of C = intensity of one neighboring pixel |
| 3 | Intensity of C > intensity of one neighboring pixel & Intensity of C = intensity of one neighboring pixel |
| 4 | Intensity of C > intensity of two neighboring pixels |
| 0 | Not related |

In Table 1, C indicates the current pixel. The category 1 in Table 1 corresponds to FIG. 13A, the category 2 in Table 1 corresponds to FIGS. 13B and 13C, the category 3 in Table 1 corresponds to FIGS. 13D and 13E, and the category 4 in Table 1 corresponds to FIG. 13F.

The video encoder sends an edge offset values for each category. The video decoder may reconstruct a pixel by adding an edge offset value corresponding to an edge type and a category for the pixel. For example, the video decoder may determine that the current pixel belongs to which one of the four edge types of FIG. 11, then determine that the current pixel belongs to which one of the categories of Table 1, and apply an offset of a corresponding category to the current pixel based on the determination.

Meanwhile, a filtering unit, that is, a unit to which an SAO is applied (called an SAO application unit, for convenience of description) is a unit having a size equal to or greater than the Largest Coding Unit (LCU) and is aligned according to the LCU boundary.

The unit to which the SAO is applied is a region from which one picture is split with a quad tree structure. The video encoder may determine for each SAO application unit whether the SAO is applied or not, an offset type, and a value of an offset and transmit the results of the determination to the video decoder. Here, to determine the offset type may be to determine that which one of a plurality of band offsets and which one of a plurality of edge offsets will be applied. The SAO application unit may be separately set for a luma component and a chroma component, and information about the SAO application unit for the luma component and the chroma component may be separately transmitted.

Figure 14:
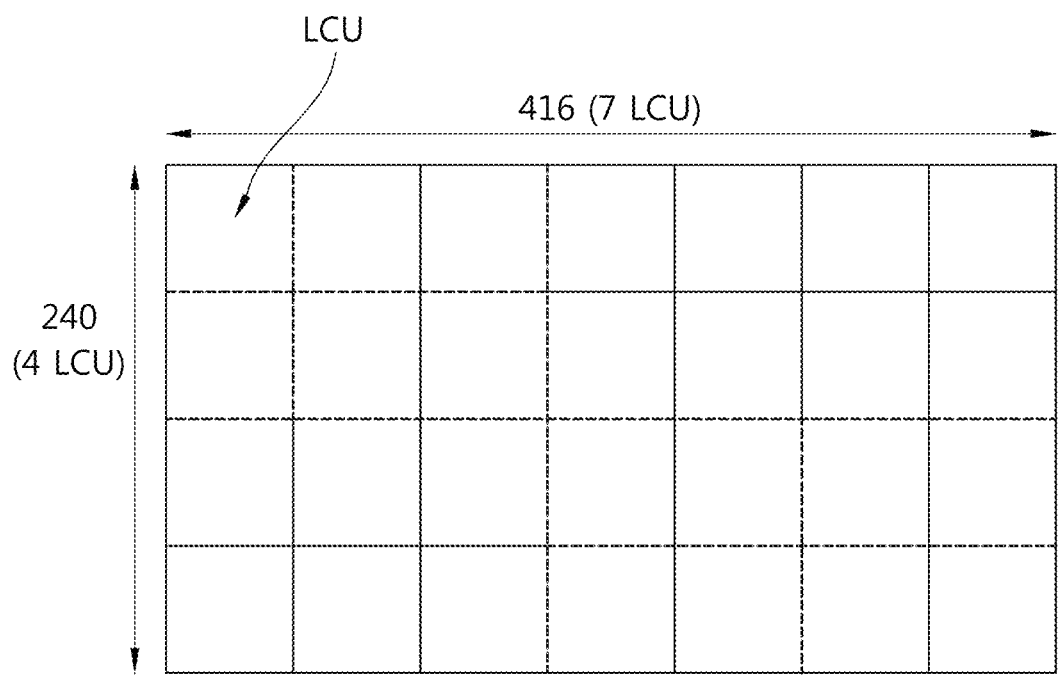
FIG. 14 is a diagram schematically illustrating the unit of SAO application.

FIG. 14 is a diagram schematically illustrating the SAO application unit. In FIG. 14, the SAO application unit corresponds to a region demarcated by dotted lines. The example of FIG. 14 shows the SAO application unit in which a WQVGA (416×240) image is split in a quad tree structure. Each SAO application unit must be equal to or larger than a minimum LCU and may be split along the boundaries of the LCUs.

As described above, the smallest unit of the SAO application unit is an LCU, but the LCU may be too large for applying a single offset according to a reduction in the size of a picture. For example, if the LCU is 64×64, the LCU may become a too large SAO application unit in reconstructing the original picture using only a single offset. Accordingly, if two or more different edges exist within one LCU, two or more edge offsets can be applied within one LCU.

If a plurality of edge offsets is applied within one SAO application unit, a plurality of edge types may be selected from the edge types of FIGS. 12A to 12D depending on the directions of edges within a region and then applied.

Syntax information necessary to perform the band offset and the edge offset of an SAO is described below.

Table 2 is a syntax structure for an SAO, and it schematically shows an example of a sequence parameter set syntax.

TABLE 2

|  | C | Descriptor |
|---|---|---|
| seq_parameter_set_rbsp( ) { | | |
| ... | | |
| sao_used_flag | 1 | u(1) |
| ... | | |
| } | | |

Table 2 shows an example of signaling indicating whether an SAO is applied to the current sequence. For example, if a value of sao_used_flag in the syntax of Table 2 is 0, it may indicate that the SAO is not used (i.e., disabled) in the current sequence. If a value of sao_used_flag in the syntax of Table 2 is 1, it may indicate that the SAO may be used (i.e., enabled) in the current sequence.

Table 3 is a syntax structure for an SAO, and it schematically shows an example of a slice header syntax.

TABLE 3

|  | C | Descriptor |
|---|---|---|
| slice_header( ) { | | |
| ... | | |
| sao_param( ) | 2 | |
| } | | |

An SAO parameter sao_param( ) for applying an SAO may be called in a slice header level through the slice header syntax shown in Table 3. The SAO parameter may be set as an additional syntax set as in Table 4.

Table 4 is a syntax structure for an SAO, and it schematically shows an example of an SAO parameter syntax.

TABLE 4

|  | C | Descriptor |
|---|---|---|
| sao_param( ) { | | |
| sao_flag | 2 | u(1)\|ae(v) |
| if( sao_flag ) { | | |
| sao_split_param( 0, 0, 0 ) | | |
| sao_offset_param( 0, 0, 0 ) | | |
| } | | |
| } | | |

Parameters necessary to apply an SAO may be transmitted through the SAO parameter syntax. The transmitted parameters, as in the example of Table 4, include sao_split_param for the splitting of an SAO application region and sao_offset_param for an offset applied as the SAO.

In the example of Table 4, if a value of sao_flag is 1, it may indicate that the SAO may be applied (i.e., enabled) to at least part of the current picture. If a value of sao_flag is 0, it may indicate that the SAO may not be applied (i.e., disabled) to the entire current picture. Accordingly, when a value of sao_flag is 1, SAO parameters may be indicated.

Table 5 is a syntax structure for an SAO, and it schematically shows an example of an sao_split_param syntax for splitting from among SAO parameters.

TABLE 5

|  | C | Descriptor |
|---|---|---|
| sao_split_param( x, y, Depth ) { | | |
| if( Depth < MaxSplitLevel ) | | |
| split_flag[ Depth ][ y ][ x ] = sao_split_flag | 2 | u(1)\|ae(v) |
| else | | |
| split_flag[ Depth ][ y ][ x ] = 0 | | |
| if( split_flag[ Depth ][ y ][ x ] ) { | | |
| pqao_split_param( x + 0, y + 0, Depth + 1 ) | | |
| pqao_split_param( x + 1, y + 0, Depth + 1 ) | | |
| pqao_split_param( x + 0, y + 1, Depth + 1 ) | | |
| pqao_split_param( x + 1, y + 1, Depth + 1 ) | | |
| } | | |
| } | | |

In the example of Table 5, sao_split_param (x, y, Depth) indicates that information about whether the SAO application unit at a position specified by (x, y) and at a depth specified by 'Depth' are further split is signalized through sao_split_flag. If a value of sao_split_flag is 0, it indicates that the current region is a leaf. Accordingly, the current region is no longer split in order to apply an SAO. If a value of sao_split_flag is 1, it indicates that the current region is further split into four children regions. If an SAO application region is split, a split parameter pqao_split_param for the four split regions may be indicated.

The split parameter pqao_split_param indicates whether the SAO application unit is further split for each split region if the SAO application unit is further split. In a point that whether the SAO application unit is split at a specific depth is indicated, the syntax sao_split_param may be used again for the split region instead of the syntax pqao_split_param, but the depth of an indicted region may be changed and used for a changed depth. For example, in indicating whether a region to which an SAO may be applied has been split or not, assuming that a region, that is, the subject of indication regarding split, and the depth thereof are (x0, y0, saoDepth), if sao_split_param (x0, y0, saoDepth) indicates that the region specified by (x0, y0) is split, the depth of each of the split regions specified by (x0+0, y0+0), (x0+0, y0+1), (x0+1, y0+0), and (x0+1, y0+1) may be adjusted to 'saoDepth+1' and whether a corresponding region will be split may be indicated.

Table 6 is a syntax for applying a band offset according to the present invention and schematically shows an example of a method of transmitting information about offsets for specific bands to which the band offset may be applied.

TABLE 6

```
type_idx[ Depth ][ y ][ x ] = sao_type_idx
if( sao_type_idx != 0 ) {
    if( sao_type_idx = offset type is bandoffset)
        start_offset
        for( i = start_offset; i < start_offset+n-1; i++ )
            offset[ Depth ][ y ][ x ][ i ] = sao_offset
}
```

In the example of Table 6, a value of sao_type_idx indicates that which of a band offset and an edge offset from among SAOs may be applied. In the example of Table 6, if a value of sao_type_idx is 0, it indicates that both the band offset and the edge offset may not be applied.

If a value of sao_type_idx indicates that the band offset may be applied, the video encoder may indicate the first band, from among bands that cover a range of pixel values to which the band offset may be applied, through syntax start_offset. Next, the video encoder may transmit band offset (SAO offset) values for n bands including the first band indicated by the syntax start_offset.

The video decoder may determine the first band, from among the bands that cover a range of pixel values to which the band offset may be applied, based on information received from the video encoder and obtain information about the offsets for the n bands including the first band.

If a value of a pixel corresponds to any one of the n bands, the video decoder may apply to the pixel the band offset value of the corresponding band to which the pixel value belongs to.

Table 7 is a syntax for applying a band offset according to the present invention and schematically shows another example of a method of transmitting information about offsets for specific bands to which the band offset may be applied.

TABLE 7

```
type_idx[ Depth ][ y ][ x ] = sao_type_idx
if( sao_type_idx != 0 ) {
    if( sao_type_idx = offset type is bandoffset)
        end_offset
        for( i = end_offset-n+1; i < end_offset; i++ )
            offset[ Depth ][ y ][ x ][ i ] = sao_offset
}
```

In the example of Table 7, a value of sao_type_idx indicates that which of a band offset and an edge offset, from among SAOs, may be applied. If a value of sao_type_idx is 0, it indicates that both the band offset and the edge offset may not be applied.

If a value of sao_type_idx indicates that the band offset may be applied, the video encoder may indicate the last band, from among the bands that cover a range of pixel values to which the band offset may be applied, through syntax end_offset. Next, the video encoder may transmit band offset (SAO offset) values for n bands including the last band indicated by the syntax end_offset.

The video decoder may determine the last band, from among the bands that cover a range of pixel values to which the band offset may be applied, based on information received from the video encoder and obtain information about offsets for the n bands including the last band.

If a value of a pixel corresponds to any one of the n bands, the video decoder may apply to the pixel the band offset value of the corresponding band to which the pixel value belongs to.

Table 8 is a syntax for applying a band offset according to the present invention and schematically shows yet another example of a method of transmitting information about offsets for specific bands to which the band offset may be applied.

TABLE 8

```
type_idx[ Depth ][ y ][ x ] = sao_type_idx
if( sao_type_idx != 0 ) {
    if( sao_type_idx = offset type is bandoffset)
        start_offset
        end_offset
        for( i = start_offset; i < end_offset; i++ )
            offset[ Depth ][ y ][ x ][ i ] = sao_offset
}
```

In the example of Table 8, a value of sao_type_idx indicates that which of a band offset and an edge offset, from among SAOs, may be applied. If a value of sao_type_idx is 0, it indicates that both the band offset and the edge offset may not be applied.

If a value of sao_type_idx indicates that the band offset may be applied, the video encoder may indicate the first band and the last band, from among bands that cover a range of pixel values to which the band offset may be applied, through syntax start_offset and syntax end_offset. Next, the video encoder may send band offset (SAO offset) values for the n bands from the first band to the last band.

The video decoder may determine the first band and the last band, from among the bands that cover a range of pixel values to which the band offset may be applied, based on information received from the video encoder and obtain information about offsets for the n bands including the first band to the last band.

If a value of a pixel corresponds to any one of the n bands, the video decoder may apply to the pixel the band offset value of the corresponding band to which the pixel value belongs to.

As described above, if a band offset is applied, the video encoder may send information, indicating a range of bands that cover a range of pixel values on which the band offset may be applied to the current picture or the current SAO application unit, to the video decoder. Furthermore, the video encoder may send band offset values for bands, belonging to the range, to the video decoder.

The video decoder may receive the information indicating the bands to which the band offset may be applied and the information about the band offsets for the bands from the video encoder. If a pixel value belongs to the bands to which the band offset may be applied, the video decoder may apply the offset value of a corresponding band to the pixel.

Table 9 schematically shows an example of syntax for performing an SAO when a band offset is applied according to the present invention.

TABLE 9

| | C | Descriptor |
|---|---|---|
| sao_offset_param ( x, y, Depth ) { | | |
|   if( split flag[ Depth ][ y ][ x ] ) { | | |
|     sao_offset_param ( x + 0, y + 0, Depth + 1 ) | | |
|     sao_offset_param ( x + 1, y + 0, Depth + 1 ) | | |
|     sao_offset_param ( x + 0, y + 1, Depth + 1 ) | | |
|     sao_offset_param ( x + 1, y + 1, Depth + 1 ) | | |

TABLE 9-continued

| | C | Descriptor |
|---|---|---|
| } else { | | |
|     type_idx[ Depth ][ y ][ x ] = sao_type_idx | 2 | ue(v)\|ae(v) |
|     if( sao_type_idx != 0 ) { | | |
|         if( sao_type_idx > 4 ) { // offset type is bandoffset | | |
|             start_offset | | |
|             end_offset | | |
|         } else { | | |
|             start_offset = 0 | | |
|             end_offset = PqaoOffsetNum[sao_type_idx] | | |
|         } | | |
|         for( i = start_offset; i < end_offset; i++ ) | | |
|             offset[ Depth ][ y ][ x ][ i ] = sao_offset | 2 | se(v)\|ae(v) |
|     } | | |
|     } | | |
| } | | |

Referring to Table 9, if an SAO application region is split, an offset parameter may be indicated for each split region.

If the SAO application region is no longer split, an offset type for the SAO application region is indicated.

In the example of Table 9, sao_type_idx indicates an offset type which may apply to the current region. The number of SAO offsets or the number of SAO categories may be determined depending on the SAO type sao_type_idx applied to the current region.

In the example of Table 9, if a value of sao_type_idx is 0, it may mean that an SAO is not applied. If a value of sao_type_idx is 1 to 4, it may mean that an edge offset is applied. The values 1 to 4 of sao_type_idx may correspond to the four types of edge offsets shown in FIG. 12. If a value of sao_type_idx is greater than 4, it may indicate that a band offset is applied. For example, when bands to which the band offset may be applied are indicated as in Tables 6 and 7, it can be set so that an application of the band offset is indicated when the value of sao_type_idx is 5. Furthermore, if the entire range of pixel values is divided into groups each having specific bands and it is indicated that the current pixel or the current SAO application unit belongs to which of the groups as described above, values of sao_type_idx greater than 4 may be set to indicate a group of bands.

The example of Table 9 shows an example in which, when a band offset is applied, bands to which the band offset may be applied are specified through start_offset and end_offset and band offset values for the bands is transmitted.

An example of syntax information indicating the number of SAO offsets or the number of SAO categories according to an offset type may include PqaoOffsetNum[sao_type_idx].

In the example of Table 9, start_offset may indicate a band of smallest number among bands to which offset may be applied or may indicate an edge type of smallest number among edge types to which offset may be applied. That is, start_offset may indicate a band having smallest index among bands to which offset may be applied or may indicate an edge type having smallest index among edge types to which offset may be applied. If start_offset is not available, start_offset may be inferred to have a value of 0. Furthermore, end_offset may indicate a band of largest number among bands to which offset may be applied or may indicate an edge type of largest number among edge types to which offset may be applied. That is, end_offset may indicate a band having largest index among bands to which offset may be applied or may indicate an edge type having largest index among edge types to which offset may be applied. If end_offset is not available, a value of end_offset may be set as the number of SAO categories (i.e., the number of offsets), that is, PqaoOffsetNum[sao_type_idx] which is determined depending on the SAO type sao_type_idx as described above.

Table 10 schematically shows an example of an SAO offset type. The number of SAO categories (i.e., the number of offsets) may be determined depending on an offset type as described above through Table 9.

TABLE 10

| SAO TYPE INDEX (sao_type_idx) | NUMBER OF SAO CATEGORY | EDGE TYPE |
|---|---|---|
| 0 | 0 | Not applied |
| 1 | 4 | 1-D 0 degree edge |
| 2 | 4 | 1-D 90 degrees edge |
| 3 | 4 | 1-D 135 degrees edge |
| 4 | 4 | 1-D 45 degrees edge |
| 5 | 16 | Central bands |
| 6 | 16 | Side band |

As in Table 10, the SAO type index may indicate any one of edge offsets and band offsets. Table 10 shows an example in which all bands are divided into two groups so to apply a band offset. The SAO type index indicates one of four edge offsets and two band offsets. An offset value is set for each category constructing an SAO type. For example, in case of an edge offset, an offset value may be set by four categories according to the intensities of the current pixel and neighboring pixels for each edge type.

Table 11 schematically shows an example regarding an SAO offset type when the number of band groups is adaptively set and a band offset is applied.

TABLE 11

| SAO TYPE INDEX (sao_type_idx) | NUMBER OF SAO CATEGORY | EDGE TYPE |
|---|---|---|
| 0 | 0 | Not applied |
| 1 | 4 | 1-D 0 degree edge |
| 2 | 4 | 1-D 90 degrees edge |
| 3 | 4 | 1-D 135 degrees edge |
| 4 | 4 | 1-D 45 degrees edge |
| 5 | 16 | Central bands |
| 6 | 12 | Side band |

In the example of Table 11, the number of categories in the central group is different from the number of categories in the side group. For example, in case of 256 pixels, in Table 10, each of the central group and the side group includes 16 groups each having 8 pixel values. In contrast, in Table 11, a group offset is applied by using the central group consisting of 16 groups each having 4 pixel values and the side group consisting of 12 groups each having 16 pixel values. Accordingly, an offset may be applied to central groups more finely.

Table 12 schematically shows another example for an SAO offset type when band groups are adaptively divided to apply a band offset.

TABLE 12

| SAO TYPE INDEX (sao_type_idx) | NUMBER OF SAO CATEGORY | EDGE TYPE |
|---|---|---|
| 0 | 0 | Not applied |
| 1 | 4 | 1-D 0 degree edge |
| 2 | 4 | 1-D 90 degrees edge |

TABLE 12-continued

| SAO TYPE INDEX (sao_type_idx) | NUMBER OF SAO CATEGORY | EDGE TYPE |
|---|---|---|
| 3 | 4 | 1-D 135 degrees edge |
| 4 | 4 | 1-D 45 degrees edge |
| 5 | 12 | Central bands |
| 6 | 16 | Side band |

Unlike in Table 11, Table 12 shows an example in which a side group is split more finely to apply a band offset. For example, in Table 12, a band offset is applied by using the central group consisting of 12 bands each having 16 pixel values and the side group consisting of 16 bands each having 4 pixel values. Accordingly, an offset may be applied to the side bands more finely.

Table 13 shows an example of a table for an SAO type when more band groups are designated to apply a band offset.

TABLE 13

| SAO TYPE INDEX (sao_type_idx) | NUMBER OF SAO CATEGORY | EDGE TYPE |
|---|---|---|
| 0 | 0 | Not applied |
| 1 | 4 | 1-D 0 degree edge |
| 2 | 4 | 1-D 90 degrees edge |
| 3 | 4 | 1-D 135 degrees edge |
| 4 | 4 | 1-D 45 degrees edge |
| 5 | 8 | First band group |
| 6 | 8 | Second band group |
| 7 | 8 | Third band group |
| 8 | 8 | Fourth band group |

In the example of Table 13, each of band groups is formed of 8 bands each having 8 pixel values. All bands belonging to each band group may be sequentially grouped from the left side as in FIG. 7.

Table 14 shows an example of a table for an SAO type when specific bands covering pixel values to which a band offset may be applied is specified for the band offset to apply the band offset.

TABLE 14

| SAO TYPE INDEX (sao_type_idx) | NUMBER OF SAO CATEGORY | EDGE TYPE |
|---|---|---|
| 0 | 0 | Not applied |
| 1 | 4 | 1-D 0 degree edge |
| 2 | 4 | 1-D 90 degrees edge |
| 3 | 4 | 1-D 135 degrees edge |
| 4 | 4 | 1-D 45 degrees edge |
| 5 | 8 | Bands |

In the example of Table 14, if a band offset is applied, the video encoder may send a value of 5 as a value of sao_type_idx to the video decoder. The video encoder may also specify a range of bands to which the band offset may be applied and send values of the band offset for the bands of the range to the video decoder as described above.

In Tables 6 to 9, an SAO type to be applied to the current pixel, from among SAO types (i.e., edge types), such as those shown in Tables 10 to 14, may be indicated through the above sao_type_idx. Referring to Tables 10 to 14, when a value of sao_type_idx is greater than 4, a band offset is applied as described above.

Table 15 schematically shows another example of syntax sao_offset_param for an offset, from among SAO parameters, as a syntax structure to which an SAO may be applied.

TABLE 15

| | C | Descriptor |
|---|---|---|
| sao_offset_param ( x, y, Depth ) { | | |
|   if( split_flag[ Depth ][ y ][ x ] ) { | | |
|     sao_offset_param ( x + 0, y + 0, Depth + 1 ) | | |
|     sao_offset_param ( x + 1, y + 0, Depth + 1 ) | | |
|     sao_offset_param ( x + 0, y + 1, Depth + 1 ) | | |
|     sao_offset_param ( x + 1, y + 1, Depth + 1 ) | | |
|   } else { | | |
|     type_idx[ Depth ][ y ][ x ] = sao_type_idx | 2 | ue(v)\|ae(v) |
|     if( sao_type_idx != 0 ) { | | |
|       if( sao_type_idx > 4 ) { // offset type is bandoffset | | |
|         total_offset_num_minus_one | | |
|         for( i=0; i<total_offset_num_minus_one + 1; i++) { | | |
|           offset_idx[i] | | |
|           offset[ Depth ][ y ][ x ][ offset_idx[i] ] = sao_offset | | |
|         } | | |
|       } else { | | |
|         for( i = 0; i < PqaoOffsetNum[sao_type_idx]; i++ ) | | |
|           offset[ Depth ][ y ][ x ][ i ] = sao_offset | 2 | se(v)\|ae(v) |
|       } | | |
|     } | | |
|   } | | |
| } | | |

Table 15 shows an example of the syntax structure for transmitting only a valid band offset. Here, the valid band offset means a band offset that may be applicable.

Since only information about a valid band offset is transmitted, information about the number of band offsets to be applied, information indicating a band offset, and information indicating values of offsets need to be transmitted.

total_offset_num_minus_one indicates the total number of offsets in a band offset. offset_idx[i] indicates that a band offset indicated by sao_type_idx corresponds to what category. sao_offset indicates an offset value for the category indicated by offset_idx[i] in a corresponding position and depth.

As described above, a plurality of edge offsets may be applied to one SAO application unit.

Table 16 schematically shows an example of a syntax structure when a plurality of edge offsets is applied to one SAO application unit.

TABLE 16

|  | C | Descriptor |
|---|---|---|
| sao_offset_param ( x, y, Depth ) {<br>    if( split_flag[ Depth ][ y ][ x ] ) {<br>        sao_offset_param ( x + 0, y + 0, Depth + 1 )<br>        sao_offset_param ( x + 1, y + 0, Depth + 1 )<br>        sao_ofsset_param ( x + 0, y + 1, Depth + 1 )<br>        sao_offset_param ( x + 1, y + 1, Depth + 1 )<br>    } else {<br>        type_idx[ Depth ][ y ][ x ] = sao_type_idx | 2 | ue(v)\|ae(v) |
|         if( sao_type_idx != 0 ) {<br>            if( sao_type_idx <5 ) {<br>                num_edge_offset<br>                for( k = 0; k < num_edge_offset; k++ ) {<br>                    for( i = 0; i < PqaoOffsetNum[ sao_type_idx ]; i++ )<br>                        offset[k][ Depth ][ y ][ x ][ i ] = sao_offset<br>            } else {<br>                for( i = 0; i < PqaoOffsetNum[ sao_type_idx ]; i++ )<br>                    offset[0][ Depth ][ y ][ x ][ i ] = sao_offset<br>            }<br>        }<br>    }<br>} | 2 | se(v)\|ae(v) |

Referring to the examples of Table 16 and Tables 10 to 14, when a value of sao_type_idx is smaller than 5, an edge offset is applied. num_edge_offset indicates the total number of offsets applied as the edge offsets.

Referring to Table 13, the edge offset may be applied to an SAO application region by as many as num_edge_offset indicates.

Meanwhile, in applying an SAO, the SAO may be applied to a chroma component by taking into consideration of a difference between luma components and chroma components.

FIG. 4 shows local distributions of histograms for the same picture. As described above, regarding the regions A and B of FIG. 4A that are a picture of the same video, FIG. 4B shows a difference in the histogram between a luma original picture and a reconstructed picture.

Regarding the regions A and B of FIG. 4A, FIG. 4C shows a difference between a histogram for a chroma (Cr) original picture (i.e., the upper and lower sides on the left side of FIG. 4C) and a histogram for the reconstructed picture (i.e., the upper and lower sides on the right side of FIG. 4C).

Furthermore, FIG. 4D shows a difference between a histogram for the chroma (Cb) original picture (i.e., the upper and lower sides on the left side of FIG. 4D) and a histogram for the reconstructed picture (i.e., the upper and lower sides on the right side of FIG. 4D).

From FIG. 4, it can be seen that there is a difference in the picture characteristics between luma and chroma for the same picture. For this reason, not only the offset of a signal for luma pixels, but also the offset of a signal for chroma pixels may be independently transmitted. Here, the offset may be applied to the chroma pixels by taking the number of luma pixels and the number of chroma pixels into consideration.

Figure 15:
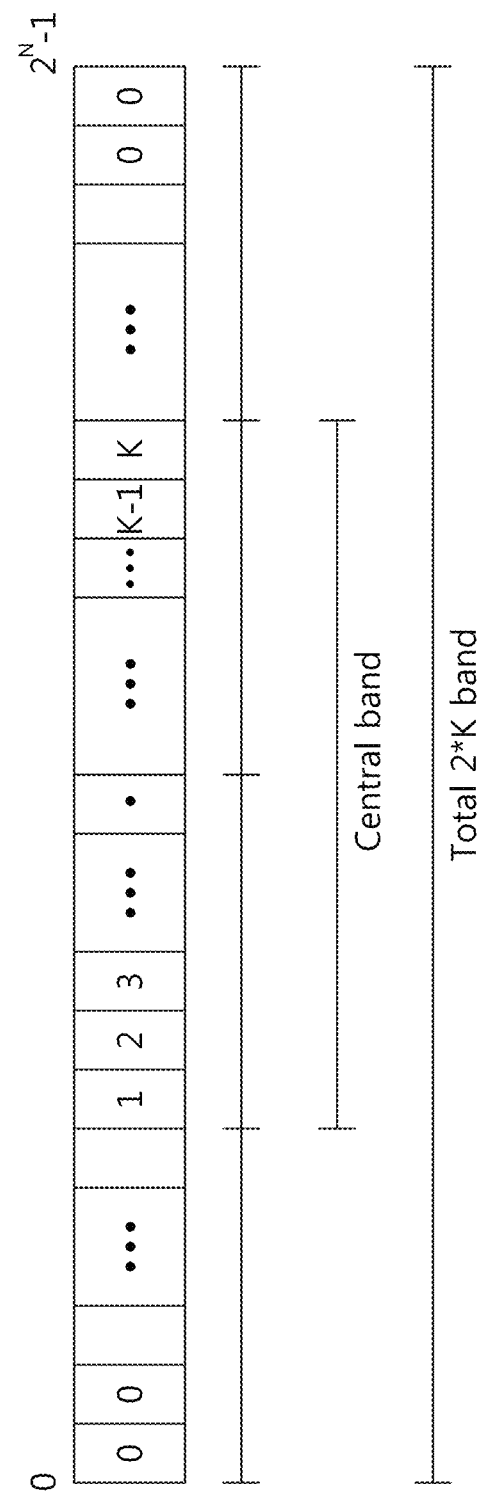
FIGS. 15 and 16 are diagrams schematically illustrating examples in which a band offset is applied to only some of all bands in relation to chroma pixels.
Figure 16:
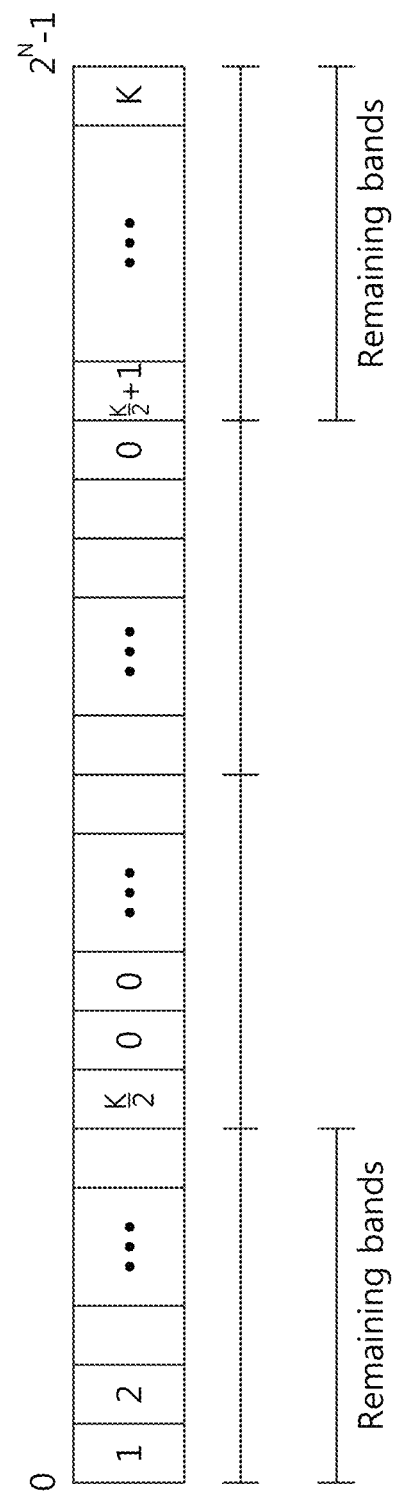

For example, if a range of the chroma signal, that is, a range of pixel values of the chroma pixels is 0 to $2^N-1$ (N is a bit depth of a pixel value), the size of the entire bit depth, that is, the range of pixel values may be divided as in the example of FIG. 15 or 16.

FIG. 15 is a diagram schematically illustrating examples in which a band offset is applied to only some of all bands for chroma pixels.

Referring to FIG. 15, chroma pixels may be allocated to a central bands composed of K bands in the center of all 2*K bands, and a band offset may be applied.

An offset value for indices 1, 2, ..., K allocated to respective bands to which the band offset may be applied may be transferred from the video encoder to the video decoder. Regarding an offset value for indices allocated to side bands to which the band offset is not applied, the indices may be designated as 0 so that an offset for chroma pixels is not indicated. An index having a value of 0 may indicate that the band offset may not be applied or may indicate that the offset value of the band offset is 0.

FIG. 16 is a diagram schematically illustrating another example in which a band offset is applied to only some of all bands for chroma pixels.

Referring to FIG. 16, chroma pixels may be applied to the remaining bands composed of side K bands of all 2*K bands, and a band offset may be applied.

An offset value for indices 1, 2, ..., K/2, K/2+1, ..., K allocated to respective bands to which the band offset may be applied may be transferred from the video encoder to the video decoder. Regarding an offset value for indices allocated to central bands to which the band offset is not applied, the indices may be designated as 0 so that an offset for chroma pixels is not indicated. An index having a value of 0 may indicate that the band offset may not be applied or may indicate that the offset value of the band offset is 0.

In the examples of FIGS. 15 and 16, assuming that K is set to a value of 16, the entire range of pixel values may be divided into 32 bands, the 32 bands may be divided into 2 groups, that is, 16 bands of a central part and 16 bands of side parts to apply a band offset.

As compared with a signal for luma pixels (i.e., a pixel value), K may be set to 8 (i.e., K=8) by reducing the number of all bands with consideration taken of a small variance in a signal for chroma pixels (i.e., a pixel value). When K=8, the number of all bands to apply a band offset is 16. A band offset for the chroma pixels can be applied with 8 central part bands and 8 side part bands. Here, a signal for luma pixels (i.e., a luma signal) is a pixel value (e.g., intensity) of a luma pixel, which is hereinafter referred to as a 'luma signal', for convenience of description.

Table 17 shows a syntax structure for independently applying an SAO to chroma and schematically shows an example of syntax sao_offset_param regarding an offset, from among SAO parameters.

TABLE 17

|  | C | Descriptor |
|---|---|---|
| sao_offset_param ( x, y, Depth ) { | | |
|   if( split_flag[ Depth ][ y ][ x ] ) { | | |
|     sao_offset_param ( x + 0, y + 0, Depth + 1 ) | | |
|     sao_offset_param ( x + 1, y + 0, Depth + 1 ) | | |
|     sao_offset_param ( x + 0, y + 1, Depth + 1 ) | | |
|     sao_offset_param ( x + 1, y + 1, Depth + 1 ) | | |
|   } else { | | |
|     type_idx[ Depth ][ y ][ x ] = sao_type_idx | 2 | ue(v)\|ae(v) |
|     if( sao_type_idx != 0 ) { | | |
|       for( i = 0; i < PqaoOffsetNum[ sao_type_idx ]; i++ ) | | |
|         offset[ Depth ][ y ][ x ][ i ] = sao_offset | 2 | se(v)\|ae(v) |
|     type_idx[ Depth ][ y ][ x ] = sao_type_cr_idx | | |
|     if( sao_type_cr_idx != 0 ) { | | |
|       for( i = 0: i < PqaoOffsetNum[ sao_type_cr_idx ]; i++ ) | | |
|         offset[ Depth ][ y ][ x ][ i ] = sao_cr_offset | | |
|     } | | |
|     type idx[ Depth ][ y ][ x ] = sao_type_cb_idx | | |
|     if( sao_type_cb_idx != 0 ) { | | |
|       for( i = 0: i < PqaoOffsetNum[ sao_type_cb_idx ]; i++ ) | | |
|         offset[ Depth ][ y ][ x ][ i ] = sao_cb_offset | | |
|     } | | |
|   } | | |
| } | | |

Referring to Table 17, sao_type_cr_idx indicates an offset type for a chroma (Cr) signal. Furthermore, sao_type_cb_idx indicates an offset type for a chroma (Cb) signal. sao_cr_offset indicates an offset value for a chroma (Cr) signal. sao_cb_offset indicates an offset value for a chroma (Cb) signal.

In the example of Table 17, when an offset type applied to a chroma (Cr) signal is indicated by sao_type_cr_idx, an offset value indicated by sao_cr_offset may be applied to the current pixel. Furthermore, when an offset type applied to a chroma (Cb) signal is indicated by sao_type_cb_idx, an offset value indicated by sao_cb_offset may be applied to the current pixel.

Figure 17:
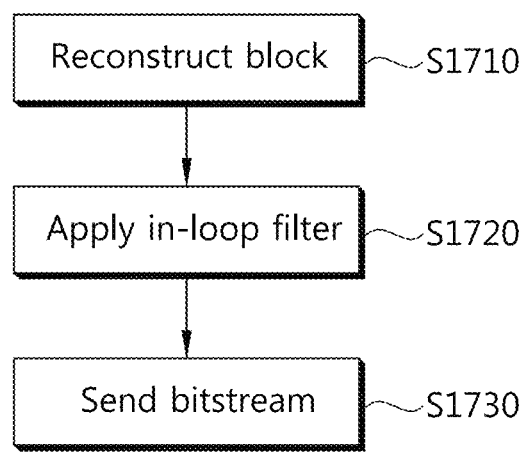
FIG. 17 is a flowchart schematically illustrating the operation of the video encoder in a system to which the present invention is applied.

FIG. 17 is a flowchart schematically illustrating the operation of the video encoder in a system to which the present invention is applied.

Referring to FIG. 17, the video encoder reconstructs a block at step S1710. The video encoder can generates a reconstructed residual block through dequantization and an inverse transform after performing quantization and transform on a residual a residual block generated based on a prediction block and the current block.

Next, the video encoder applies an in-loop filter to reconstructed blocks at step S172. The in-loop filter may be applied in the filter module of FIG. 1, and at least one of a deblocking filter, an SAO, and an ALF may be used as the in-loop filter. Here, the SAO may be applied to a picture to which the deblocking filter has been applied, per pixel. The SAO may be applied to the reconstructed blocks for each SAO application unit. The ALF may be applied after the SAO is applied.

If the SAO is applied, the filter module may apply an offset per a pixel unit. Here, the filter module may adaptively determine the number of offsets (i.e., the number of bands) for applying a band offset and a group of the bands and may send only an offset for valid bands (bands that cover a range of pixel values to which the band offset may be applied) to the video decoder. Furthermore, the filter module may apply a plurality of edge offsets within an SAO application region. The details have been described above.

Furthermore, the filter module may apply an SAO to chroma pixels. A region to which the SAO may be applied may be independently defined in cases of luma and chroma. Furthermore, in case of a band offset for chroma, the number of bands and a group may be determined in order to apply an offset to chroma pixels. The details have been described above.

Next, the video encoder may send a bitstream, including video information about a picture to which the SAO, etc. is applied and video information about the SAO, to the video decoder at step S1730. Here, the video encoder may perform processes, such as a transform, quantization, re-arrangement, and entropy coding, in order to transmit the pieces of information. If a band offset is applied, the video encoder may send information indicating bands that cover a range of pixel values to which the band offset may be applied and band offset values for the bands.

Figure 18:
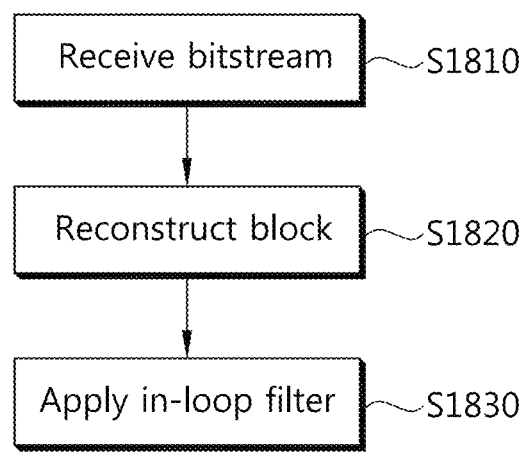
FIG. 18 is a flowchart schematically illustrating the operation of the video decoder in a system to which the present invention is applied.

FIG. 18 is a flowchart schematically illustrating the operation of the video decoder in a system to which the present invention is applied.

Referring to FIG. 18, the video decoder receives a bitstream from the video encoder at step S1810. The received bitstream includes not only information about a picture, but also other information necessary to reconstruct the video information.

The video decoder reconstructs a block based on the pieces of received information at step S1820. The video decoder generates a reconstructed block on the basis of a prediction block generated based on prediction and a residual block generated through dequantization and an inverse transform. In order to generate the residual block, the video decoder may perform entropy decoding and re-arrangement before performing the dequantization and inverse transform.

The video decoder applies an in-loop filter to the reconstructed block at step S1830. The in-loop filtering may be used in the filter module of FIG. 2. At least one of deblocking filter, an SAO, and an ALF may be used in the filter module. Here, the SAO may be applied to a picture by a pixel unit, to which the deblocking filter has been applied. The SAO may be applied to the reconstructed blocks for each SAO application unit. The ALF may be applied to a picture to which the SAO has been applied.

When the SAO is applied, the filter module may apply an offset to each pixel. Here, the filter module may derive SAO parameters on the basis of syntax elements received from the video encoder. The filter module may apply a band offset to the current pixel on the basis of the number of offsets (i.e., the number of bands) and a group of the bands which are indicated by information about the application of the SAO, such as the SAO parameters. Here, information about an offset for valid bands (i.e., bands that cover a pixel range to which a band offset will be applied) only may be transmitted to the video decoder. Furthermore, the filter module may apply a plurality of edge offsets within a corresponding SAO application region based on indication of the SAO parameters. The detailed description has been given above.

Furthermore, the filter module may apply the SAO to chroma pixels. Regions to which the SAO may be applied may be independently defined in cases of luma and chroma, and related information may be received from the video encoder. Furthermore, information about the number of bands and a group of the bands for applying a band offset to chroma pixels may be received from the video encoder. The video decoder may perform the SAO on the chroma pixels on the basis of the received information. The detailed description has been given above.

In the above description, the terms a 'pixel value' and the 'intensity of a pixel' have been used interchangeably in order to clarify the characteristics of the invention, but the two terms may be interpreted as having the same meaning or the term the 'pixel value' may be interpreted as having a meaning including the 'intensity of a pixel'. Furthermore, regarding a unit region to which an SAO is applied, the filtering unit and the SAO application unit have been used interchangeably for convenience of description, but it is to be noted that they may be interpreted as having the same meaning. In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, the above-described embodiments include various aspects of examples. Accordingly, the present invention should be construed to include all other alternations, modifications, and changes which fall within the scope of the claims.

In the description regarding the present invention, when it is said that one element is "connected" or "coupled" to the other element, the one element may be directly connected or coupled to the other element, but it should be understood that a third element may exist between the two elements. In contrast, when it is said that one element is "directly connected" or "directly coupled" to the other element, it should be understood that a third element does not exist between the two elements.

The invention claimed is:

1. A video decoding apparatus, comprising:
an entropy decoding module configured to obtain prediction information, residual information and offset information from a received bitstream;
a prediction module configured to generate a prediction sample based on the prediction information;
an inverse transform module configured to derive a residual sample, wherein the residual sample is derived based on the residual information;
an adder module configured to generate a reconstructed picture based on the prediction sample and the residual sample; and
a filter module configured to apply a deblocking filtering process to the reconstructed picture and to apply a sample adaptive offset (SAO) process to a sample in the reconstructed picture based on the offset information after completing the deblocking filtering process,
wherein the offset information includes flag information about whether the SAO process is enabled to the sample, and
wherein the offset information includes band information indicating one of 32 bands as a starting band of a band group consisting of consecutive n bands among the 32 bands, an offset for a band among the n bands is applied to the sample, wherein n is a positive integer.

2. The apparatus of claim 1, wherein the offset information includes type information for specifying an offset type for the sample as a band offset type.

3. The apparatus of claim 2, wherein the type information is obtained based on entropy decoding using a context-adaptive arithmetic coding on the bitstream.

4. The apparatus of claim 2, wherein the offset information includes offset information for a magnitude of the offset applied to the sample.

5. The apparatus of claim 4, wherein the offset information is obtained based on entropy decoding using a context-adaptive arithmetic coding on the bitstream.

6. The apparatus of claim 1, wherein the band is determined as a predetermined sample value range to which the sample belongs.

7. The apparatus of claim 1, wherein the n is determined as constant number.

8. The apparatus of claim 1, wherein the 32 bands are sections into which the whole sample value regions are divided with a constant size.

9. A video encoding apparatus, comprising:
a prediction module configured to generate a prediction sample in a current picture based on intra prediction or inter prediction;
an adder module configured to generate a reconstructed picture based on the prediction sample;
a filter module configured to apply a deblocking filtering process to the reconstructed picture and to apply a sample adaptive offset (SAO) process to a sample in the reconstructed picture after completing the deblocking filtering process; and an entropy encoding module configured to encode video information to generate a bitstream, wherein the video information includes offset information on the SAO process, wherein the offset information includes flag information about whether the SAO process is enabled to the sample, and wherein the offset information includes band information indicating one of 32 bands as a starting band of a band group consisting of consecutive n bands among the 32 bands, an offset for a band among the n bands is applied to the sample, wherein n is a positive integer.

10. The apparatus of claim 9, wherein the offset information includes type information for specifying an offset type for the sample as a band offset type.

11. The apparatus of claim 10, wherein the type information is encoded based on entropy encoding using a context-adaptive arithmetic coding.

12. The apparatus of claim 9, wherein the offset information includes offset information for a magnitude of the offset applied to the sample.

13. The apparatus of claim 12, wherein the offset information for the magnitude is encoded based on entropy encoding using a context-adaptive arithmetic coding.

14. The apparatus of claim 9, wherein the band is determined as a predetermined sample value range to which the sample belongs.

15. The apparatus of claim 9, wherein the n is determined as a constant number.

16. The apparatus of claim 9, wherein the band information further indicates one of the 32 bands as an ending band of the band group, the consecutive n bands are determined based on the starting bands and the ending band.

17. The apparatus of claim 9, wherein the 32 bands are sections into which the whole sample value regions are divided with a constant size.

18. A non-transitory decoder-readable storage medium storing a bitstream generated by performing generating a prediction sample in a current picture based on intra prediction or inter prediction, generating a reconstructed picture based on the prediction sample, applying a deblocking filtering process to the reconstructed picture, applying a sample adaptive offset (SAO) process to a sample in the reconstructed picture after completing the deblocking filtering process, and encoding video information to generate the bitstream, wherein the video information includes offset information on the SAO process, wherein the offset information includes flag information about whether the SAO process is enabled to the sample, wherein the offset information includes band information indicating one of 32 bands as a starting band of a band group consisting of consecutive n bands among the 32 bands, an offset for a band among the n bands is applied to the sample, wherein n is a positive integer.

* * * * *